(12) United States Patent
Kim et al.

(10) Patent No.: US 7,692,636 B2
(45) Date of Patent: Apr. 6, 2010

(54) SYSTEMS AND METHODS FOR HANDWRITING TO A SCREEN

(75) Inventors: Jane T Kim, Seattle, WA (US); Shiraz J. Cupala, Seattle, WA (US); Peter D. Sommer, Carnation, WA (US); J. Brian Smith, Redmond, WA (US); Simin Wang, Redmond, WA (US); Natalie M Eason, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 1349 days.

(21) Appl. No.: 10/955,665

(22) Filed: Sep. 30, 2004

(65) Prior Publication Data

US 2006/0071910 A1 Apr. 6, 2006

(51) Int. Cl.
*G09G 5/00* (2006.01)
(52) U.S. Cl. .................................. 345/173; 345/156
(58) Field of Classification Search ......... 345/156–158, 345/173–179; 382/187–189; 178/18.3; 715/780
See application file for complete search history.

(56) References Cited

U.S. PATENT DOCUMENTS

| | | | |
|---|---|---|---|
| 4,498,147 A | 2/1985 | Agnew et al. | |
| 4,514,800 A | 4/1985 | Gruner et al. | |
| 4,641,274 A | 2/1987 | Swank | |
| 4,674,040 A | 6/1987 | Barker et al. | |
| 4,723,211 A | 2/1988 | Barker et al. | |
| 4,739,477 A | 4/1988 | Barker et al. | |
| 4,815,029 A | 3/1989 | Barker et al. | |
| 4,847,749 A | 7/1989 | Collins et al. | |
| 4,910,663 A | 3/1990 | Bailey | |
| 4,926,476 A | 5/1990 | Covey | |
| 4,933,880 A | 6/1990 | Borgendale et al. | |
| 4,962,475 A | 10/1990 | Hernandez et al. | |
| 5,072,412 A | 12/1991 | Henderson, Jr. et al. | |
| 5,140,563 A | 8/1992 | Thinesen | |
| 5,179,703 A | 1/1993 | Evans | |
| 5,182,709 A | 1/1993 | Makus | |
| 5,187,786 A | 2/1993 | Densmore et al. | |
| 5,191,645 A | 3/1993 | Carlucci et al. | |
| 5,195,183 A | 3/1993 | Miller et al. | |
| 5,204,947 A | 4/1993 | Bernstein et al. | |
| 5,206,951 A | 4/1993 | Khoyi et al. | |

(Continued)

FOREIGN PATENT DOCUMENTS

EP 0841615 11/1999

(Continued)

OTHER PUBLICATIONS

Cover, XML Forms Architecture, retrieved at << http://xml.coverpages.org/xfa.html>> on Aug. 17, 2006, Coverpages, Jun. 16, 1999.

(Continued)

*Primary Examiner*—Henry N Tran
*Assistant Examiner*—Christopher E Leiby

(57) ABSTRACT

Systems and methods are described that enable handwriting into a data-entry field on a screen without independently selecting that data-entry field. These systems and methods can also provide a handwriting guide geographically associated with a data-entry field into which a user is intending to write that permits substantially all of a computing device's screen to be viewed.

19 Claims, 7 Drawing Sheets

U.S. PATENT DOCUMENTS

| | | |
|---|---|---|
| 5,218,672 A | 6/1993 | Morgan et al. |
| 5,220,649 A | 6/1993 | Forcier |
| 5,237,680 A | 8/1993 | Adams et al. |
| 5,249,275 A | 9/1993 | Srivastava |
| 5,274,803 A | 12/1993 | Dubin et al. |
| 5,297,249 A | 3/1994 | Bernstein et al. |
| 5,297,283 A | 3/1994 | Kelly, Jr. et al. |
| 5,313,631 A | 5/1994 | Kao |
| 5,313,646 A | 5/1994 | Hendricks et al. |
| 5,317,686 A | 5/1994 | Salas et al. |
| 5,333,317 A | 7/1994 | Dann |
| 5,339,423 A | 8/1994 | Beitel et al. |
| 5,339,424 A | 8/1994 | Fushimi |
| 5,341,478 A | 8/1994 | Travis, Jr. et al. |
| 5,369,766 A | 11/1994 | Nakano et al. |
| 5,369,778 A | 11/1994 | San Soucie et al. |
| 5,371,675 A | 12/1994 | Greif et al. |
| 5,377,323 A | 12/1994 | Vasudevan |
| 5,379,419 A | 1/1995 | Heffernan et al. |
| 5,381,547 A | 1/1995 | Flug et al. |
| 5,390,325 A | 2/1995 | Miller |
| 5,396,623 A | 3/1995 | McCall et al. |
| 5,408,665 A | 4/1995 | Fitzgerald |
| 5,410,646 A | 4/1995 | Tondevold et al. |
| 5,410,688 A | 4/1995 | Williams et al. |
| 5,412,772 A | 5/1995 | Monson |
| 5,434,975 A | 7/1995 | Allen |
| 5,436,637 A | 7/1995 | Gayraud et al. |
| 5,438,659 A | 8/1995 | Notess et al. |
| 5,440,744 A | 8/1995 | Jacobson et al. |
| 5,446,842 A | 8/1995 | Schaeffer et al. |
| 5,459,865 A | 10/1995 | Heninger et al. |
| 5,481,722 A | 1/1996 | Skinner |
| 5,497,489 A | 3/1996 | Menne |
| 5,504,898 A | 4/1996 | Klein |
| 5,517,655 A | 5/1996 | Collins et al. |
| 5,535,389 A | 7/1996 | Elder et al. |
| 5,542,070 A | 7/1996 | LeBlanc et al. |
| 5,550,976 A | 8/1996 | Henderson et al. |
| 5,551,035 A | 8/1996 | Arnold et al. |
| 5,566,330 A | 10/1996 | Sheffield |
| 5,572,643 A | 11/1996 | Judson |
| 5,572,648 A | 11/1996 | Bibayan |
| 5,577,252 A | 11/1996 | Nelson et al. |
| 5,581,686 A | 12/1996 | Koppolu et al. |
| 5,581,760 A | 12/1996 | Atkinson et al. |
| 5,600,789 A | 2/1997 | Parker et al. |
| 5,602,996 A | 2/1997 | Powers, III et al. |
| 5,608,720 A | 3/1997 | Biegel et al. |
| 5,625,783 A | 4/1997 | Ezekiel et al. |
| 5,627,979 A | 5/1997 | Chang et al. |
| 5,630,126 A | 5/1997 | Redpath |
| 5,634,121 A | 5/1997 | Tracz et al. |
| 5,640,544 A | 6/1997 | Onodera et al. |
| 5,644,738 A | 7/1997 | Goldman et al. |
| 5,649,099 A | 7/1997 | Theimer et al. |
| 5,659,729 A | 8/1997 | Nielsen |
| 5,664,178 A | 9/1997 | Sinofsky |
| 5,668,966 A | 9/1997 | Ono et al. |
| 5,669,005 A | 9/1997 | Curbow et al. |
| 5,682,536 A | 10/1997 | Atkinson et al. |
| 5,689,667 A | 11/1997 | Kurtenbach |
| 5,689,703 A | 11/1997 | Atkinson et al. |
| 5,704,029 A | 12/1997 | Wright, Jr. |
| 5,706,501 A | 1/1998 | Horikiri et al. |
| 5,717,939 A | 2/1998 | Bricklin et al. |
| 5,721,824 A | 2/1998 | Taylor |
| 5,740,439 A | 4/1998 | Atkinson et al. |
| 5,742,504 A | 4/1998 | Meyer et al. |
| 5,745,683 A | 4/1998 | Lee et al. |
| 5,745,712 A | 4/1998 | Turpin et al. |
| 5,758,184 A | 5/1998 | Lucovsky et al. |
| 5,758,358 A | 5/1998 | Ebbo |
| 5,761,408 A | 6/1998 | Kolawa et al. |
| 5,761,683 A | 6/1998 | Logan et al. |
| 5,764,984 A | 6/1998 | Loucks |
| 5,764,985 A | 6/1998 | Smale |
| 5,778,372 A | 7/1998 | Cordell et al. |
| 5,778,402 A | 7/1998 | Gipson |
| 5,784,555 A | 7/1998 | Stone |
| 5,790,796 A | 8/1998 | Sadowsky |
| 5,798,757 A | 8/1998 | Smith |
| 5,801,701 A | 9/1998 | Koppolu et al. |
| 5,802,304 A | 9/1998 | Stone |
| 5,806,079 A | 9/1998 | Rivette et al. |
| 5,815,830 A | 9/1998 | Anthony |
| 5,826,031 A | 10/1998 | Nielsen |
| 5,826,265 A | 10/1998 | Van Huben et al. |
| 5,835,777 A | 11/1998 | Staelin |
| 5,838,906 A | 11/1998 | Doyle et al. |
| 5,842,018 A | 11/1998 | Atkinson et al. |
| 5,845,077 A | 12/1998 | Fawcett |
| 5,845,090 A | 12/1998 | Collins, III et al. |
| 5,845,122 A | 12/1998 | Nielsen et al. |
| 5,854,630 A | 12/1998 | Nielsen |
| 5,859,973 A | 1/1999 | Carpenter et al. |
| 5,862,372 A | 1/1999 | Morris et al. |
| 5,862,379 A | 1/1999 | Rubin et al. |
| 5,864,819 A | 1/1999 | De Armas et al. |
| 5,873,088 A | 2/1999 | Hayashi et al. |
| 5,905,492 A | 5/1999 | Straub et al. |
| 5,907,704 A | 5/1999 | Gudmundson et al. |
| 5,910,895 A | 6/1999 | Proskauer et al. |
| 5,911,776 A | 6/1999 | Guck |
| 5,915,112 A | 6/1999 | Boutcher |
| 5,919,247 A | 7/1999 | Van Hoff et al. |
| 5,922,072 A | 7/1999 | Hutchinson et al. |
| 5,928,363 A | 7/1999 | Ruvolo |
| 5,929,858 A | 7/1999 | Shibata et al. |
| 5,940,075 A | 8/1999 | Mutschler, III et al. |
| 5,950,010 A | 9/1999 | Hesse et al. |
| 5,953,731 A | 9/1999 | Glaser |
| 5,956,481 A | 9/1999 | Walsh et al. |
| 5,960,199 A | 9/1999 | Brodsky et al. |
| 5,963,964 A | 10/1999 | Nielsen |
| 5,973,696 A | 10/1999 | Agranat et al. |
| 5,974,454 A | 10/1999 | Apfel et al. |
| 5,982,370 A | 11/1999 | Kamper |
| 5,983,348 A | 11/1999 | Ji |
| 5,987,480 A | 11/1999 | Donohue et al. |
| 5,991,710 A | 11/1999 | Papineni et al. |
| 5,991,731 A | 11/1999 | Colon et al. |
| 5,991,877 A | 11/1999 | Luckenbaugh |
| 5,995,103 A | 11/1999 | Ashe |
| 5,999,740 A | 12/1999 | Rowley |
| 6,005,570 A | 12/1999 | Gayraud et al. |
| 6,012,066 A | 1/2000 | Discount et al. |
| 6,014,135 A | 1/2000 | Fernandes |
| 6,016,520 A | 1/2000 | Facq et al. |
| 6,018,743 A | 1/2000 | Xu |
| 6,021,403 A | 2/2000 | Horvitz et al. |
| 6,026,379 A | 2/2000 | Haller et al. |
| 6,026,416 A | 2/2000 | Kanerva et al. |
| 6,031,989 A | 2/2000 | Cordell |
| 6,035,297 A | 3/2000 | Van Huben et al. |
| 6,035,309 A | 3/2000 | Dauerer et al. |
| 6,044,205 A | 3/2000 | Reed et al. |
| 6,052,531 A | 4/2000 | Waldin et al. |
| 6,052,710 A | 4/2000 | Saliba et al. |
| 6,054,987 A | 4/2000 | Richardson |
| 6,057,837 A | 5/2000 | Hatakeda et al. |
| 6,058,413 A | 5/2000 | Flores et al. |
| 6,065,043 A | 5/2000 | Domenikos et al. |
| 6,069,626 A | 5/2000 | Cline et al. |

| | | | |
|---|---|---|---|
| 6,070,184 A | 5/2000 | Blount et al. |
| 6,072,870 A | 6/2000 | Nguyen et al. |
| 6,078,326 A | 6/2000 | Kilmer et al. |
| 6,078,327 A | 6/2000 | Liman et al. |
| 6,078,924 A | 6/2000 | Ainsbury et al. |
| 6,081,610 A | 6/2000 | Dwork et al. |
| 6,084,585 A | 7/2000 | Kraft et al. |
| 6,088,679 A | 7/2000 | Barkley |
| 6,088,708 A | 7/2000 | Burch et al. |
| 6,091,417 A | 7/2000 | Lefkowitz |
| 6,094,657 A | 7/2000 | Hailpern et al. |
| 6,096,096 A | 8/2000 | Murphy et al. |
| 6,098,081 A | 8/2000 | Heidorn et al. |
| 6,105,012 A | 8/2000 | Chang et al. |
| 6,108,637 A | 8/2000 | Blumenau |
| 6,108,783 A | 8/2000 | Krawczyk et al. |
| 6,115,646 A | 9/2000 | Fiszman et al. |
| 6,121,965 A | 9/2000 | Kenney et al. |
| 6,122,647 A | 9/2000 | Horowitz et al. |
| 6,144,969 A | 11/2000 | Inokuchi et al. |
| 6,151,624 A | 11/2000 | Teare et al. |
| 6,154,128 A | 11/2000 | Wookey et al. |
| 6,163,772 A | 12/2000 | Kramer et al. |
| 6,167,521 A | 12/2000 | Smith et al. |
| 6,167,523 A | 12/2000 | Strong |
| 6,182,094 B1 | 1/2001 | Humpleman et al. |
| 6,182,095 B1 | 1/2001 | Leymaster et al. |
| 6,188,401 B1 | 2/2001 | Peyer |
| 6,191,797 B1 | 2/2001 | Politis |
| 6,192,367 B1 | 2/2001 | Hawley et al. |
| 6,195,661 B1 | 2/2001 | Filepp et al. |
| 6,199,204 B1 | 3/2001 | Donohue |
| 6,209,128 B1 | 3/2001 | Gerard et al. |
| 6,216,152 B1 | 4/2001 | Wong et al. |
| 6,219,423 B1 | 4/2001 | Davis |
| 6,219,698 B1 | 4/2001 | Iannucci et al. |
| 6,225,996 B1 | 5/2001 | Gibb et al. |
| 6,235,027 B1 | 5/2001 | Herzon |
| 6,243,088 B1 | 6/2001 | McCormack et al. |
| 6,253,366 B1 | 6/2001 | Mutschler, III |
| 6,253,374 B1 | 6/2001 | Dresevic et al. |
| 6,263,313 B1 | 7/2001 | Milsted et al. |
| 6,266,810 B1 | 7/2001 | Tanaka et al. |
| 6,268,852 B1 | 7/2001 | Lindhorst et al. |
| 6,272,506 B1 | 8/2001 | Bell |
| 6,275,227 B1 | 8/2001 | DeStefano |
| 6,275,599 B1 | 8/2001 | Adler et al. |
| 6,279,042 B1 | 8/2001 | Ouchi |
| 6,281,896 B1 | 8/2001 | Alimpich et al. |
| 6,282,709 B1 | 8/2001 | Reha et al. |
| 6,282,711 B1 | 8/2001 | Halpern et al. |
| 6,286,033 B1 | 9/2001 | Kishinsky et al. |
| 6,292,897 B1 | 9/2001 | Gennaro et al. |
| 6,292,941 B1 | 9/2001 | Jollands |
| 6,297,819 B1 | 10/2001 | Furst |
| 6,300,948 B1 | 10/2001 | Geller et al. |
| 6,307,955 B1 | 10/2001 | Zank et al. |
| 6,308,179 B1 | 10/2001 | Petersen et al. |
| 6,308,273 B1 | 10/2001 | Goertzel et al. |
| 6,311,221 B1 | 10/2001 | Raz et al. |
| 6,311,271 B1 | 10/2001 | Gennaro et al. |
| 6,314,415 B1 | 11/2001 | Mukherjee |
| 6,321,259 B1 | 11/2001 | Ouellette et al. |
| 6,321,334 B1 | 11/2001 | Jerger et al. |
| 6,327,628 B1 | 12/2001 | Anuff et al. |
| 6,331,864 B1 | 12/2001 | Coco et al. |
| 6,336,214 B1 | 1/2002 | Sundaresan |
| 6,342,907 B1 | 1/2002 | Petty et al. |
| 6,343,302 B1 | 1/2002 | Graham |
| 6,343,377 B1 | 1/2002 | Gessner et al. |
| 6,344,862 B1 | 2/2002 | Williams et al. |
| 6,345,256 B1 | 2/2002 | Milsted et al. |
| 6,345,278 B1 | 2/2002 | Hitchcock et al. |
| 6,345,361 B1 | 2/2002 | Jerger et al. |
| 6,347,323 B1 | 2/2002 | Garber et al. |
| 6,349,408 B1 | 2/2002 | Smith |
| 6,353,851 B1 | 3/2002 | Anupam et al. |
| 6,353,926 B1 | 3/2002 | Parthesarathy et al. |
| 6,356,906 B1 | 3/2002 | Lippert et al. |
| 6,357,038 B1 | 3/2002 | Scouten |
| 6,366,907 B1 | 4/2002 | Fanning et al. |
| 6,366,912 B1 | 4/2002 | Wallent et al. |
| 6,367,013 B1 | 4/2002 | Bisbee et al. |
| 6,369,840 B1 | 4/2002 | Barnett et al. |
| 6,369,841 B1 | 4/2002 | Salomon et al. |
| 6,374,402 B1 | 4/2002 | Schmeidler et al. |
| 6,381,742 B2 | 4/2002 | Forbes et al. |
| 6,381,743 B1 | 4/2002 | Mutschler, III |
| 6,389,434 B1 | 5/2002 | Rivette et al. |
| 6,393,456 B1 | 5/2002 | Ambler et al. |
| 6,393,469 B1 | 5/2002 | Dozier et al. |
| 6,396,488 B1 | 5/2002 | Simmons et al. |
| 6,397,264 B1 | 5/2002 | Stasnick et al. |
| 6,405,221 B1 | 6/2002 | Levine et al. |
| 6,405,238 B1 | 6/2002 | Votipka |
| 6,408,311 B1 | 6/2002 | Baisley et al. |
| 6,414,700 B1 | 7/2002 | Kurtenbach et al. |
| 6,421,070 B1 | 7/2002 | Ramos et al. |
| 6,421,656 B1 | 7/2002 | Cheng et al. |
| 6,421,777 B1 | 7/2002 | Pierre-Louis |
| 6,425,125 B1 | 7/2002 | Fries et al. |
| 6,429,885 B1 | 8/2002 | Saib et al. |
| 6,434,563 B1 | 8/2002 | Pasquali et al. |
| 6,434,564 B2 | 8/2002 | Ebert |
| 6,442,563 B1 | 8/2002 | Bacon et al. |
| 6,442,755 B1 | 8/2002 | Lemmons et al. |
| 6,446,110 B1 | 9/2002 | Lection et al. |
| 6,449,617 B1 | 9/2002 | Quinn et al. |
| 6,457,009 B1 | 9/2002 | Bollay |
| 6,460,058 B2 | 10/2002 | Koppolu et al. |
| 6,463,419 B1 | 10/2002 | Kluss |
| 6,470,349 B1 | 10/2002 | Heninger et al. |
| 6,473,800 B1 | 10/2002 | Jerger et al. |
| 6,476,828 B1 | 11/2002 | Burkett et al. |
| 6,476,833 B1 | 11/2002 | Moshfeghi |
| 6,477,544 B1 | 11/2002 | Bolosky et al. |
| 6,480,860 B1 | 11/2002 | Monday |
| 6,487,566 B1 | 11/2002 | Sundaresan |
| 6,490,601 B1 | 12/2002 | Markus et al. |
| 6,493,702 B1 | 12/2002 | Adar et al. |
| 6,502,101 B1 | 12/2002 | Verprauskus et al. |
| 6,502,103 B1 | 12/2002 | Frey et al. |
| 6,505,200 B1 | 1/2003 | Ims et al. |
| 6,505,230 B1 | 1/2003 | Mohan et al. |
| 6,505,300 B2 | 1/2003 | Chan et al. |
| 6,507,856 B1 | 1/2003 | Chen et al. |
| 6,516,322 B1 | 2/2003 | Meredith |
| 6,519,617 B1 | 2/2003 | Wanderski et al. |
| 6,535,229 B1 | 3/2003 | Kraft |
| 6,535,883 B1 | 3/2003 | Lee et al. |
| RE38,070 E | 4/2003 | Spies et al. |
| 6,546,546 B1 | 4/2003 | Van Doorn et al. |
| 6,546,554 B1 | 4/2003 | Schmidt et al. |
| 6,549,221 B1 | 4/2003 | Brown et al. |
| 6,549,878 B1 | 4/2003 | Lowry et al. |
| 6,549,922 B1 | 4/2003 | Srivastava et al. |
| 6,553,402 B1 | 4/2003 | Makarios et al. |
| 6,560,616 B1 | 5/2003 | Garber |
| 6,560,620 B1 | 5/2003 | Ching |
| 6,560,640 B2 | 5/2003 | Smethers |
| 6,563,514 B1 | 5/2003 | Samar |
| 6,571,253 B1 | 5/2003 | Thompson et al. |
| 6,578,144 B1 | 6/2003 | Gennaro et al. |
| 6,581,061 B2 | 6/2003 | Graham |
| 6,584,469 B1 | 6/2003 | Chiang et al. |
| 6,584,548 B1 | 6/2003 | Bourne et al. |

| | | |
|---|---|---|
| 6,585,778 B1 | 7/2003 | Hind et al. |
| 6,589,290 B1 | 7/2003 | Maxwell et al. |
| 6,594,686 B1 | 7/2003 | Edwards et al. |
| 6,598,219 B1 | 7/2003 | Lau |
| 6,603,489 B1 | 8/2003 | Edlund et al. |
| 6,604,099 B1 | 8/2003 | Chung et al. |
| 6,606,606 B2 | 8/2003 | Starr |
| 6,609,200 B2 | 8/2003 | Anderson et al. |
| 6,611,822 B1 | 8/2003 | Beams et al. |
| 6,611,840 B1 | 8/2003 | Baer et al. |
| 6,611,843 B1 | 8/2003 | Jacobs |
| 6,613,098 B1 | 9/2003 | Sorge et al. |
| 6,615,276 B1 | 9/2003 | Mastrianni et al. |
| 6,629,109 B1 | 9/2003 | Koshisaka |
| 6,631,357 B1 | 10/2003 | Perkowski |
| 6,631,379 B2 | 10/2003 | Cox |
| 6,631,497 B1 | 10/2003 | Jamshidi et al. |
| 6,631,519 B1 | 10/2003 | Nicholson et al. |
| 6,632,251 B1 | 10/2003 | Rutten et al. |
| 6,633,315 B1 | 10/2003 | Sobeski et al. |
| 6,635,089 B1 | 10/2003 | Burkett et al. |
| 6,636,845 B2 | 10/2003 | Chau et al. |
| 6,643,633 B2 | 11/2003 | Chau et al. |
| 6,643,652 B2 | 11/2003 | Helgeson et al. |
| 6,643,684 B1 | 11/2003 | Malkin et al. |
| 6,651,217 B1 | 11/2003 | Kennedy et al. |
| 6,654,737 B1 | 11/2003 | Nunez |
| 6,654,932 B1 | 11/2003 | Bahrs et al. |
| 6,658,417 B1 | 12/2003 | Stakutis et al. |
| 6,658,622 B1 | 12/2003 | Aiken et al. |
| 6,661,920 B1 | 12/2003 | Skinner |
| 6,668,369 B1 | 12/2003 | Krebs et al. |
| 6,671,805 B1 | 12/2003 | Brown et al. |
| 6,675,202 B1 | 1/2004 | Perttunen |
| 6,678,717 B1 | 1/2004 | Schneider |
| 6,681,370 B2 | 1/2004 | Gounares et al. |
| 6,691,230 B1 | 2/2004 | Bardon |
| 6,691,281 B1 | 2/2004 | Sorge et al. |
| 6,697,944 B1 | 2/2004 | Jones et al. |
| 6,701,434 B1 | 3/2004 | Rohatgi |
| 6,701,486 B1 | 3/2004 | Weber et al. |
| 6,704,906 B1 | 3/2004 | Yankovich et al. |
| 6,711,679 B1 | 3/2004 | Guski et al. |
| 6,720,985 B1 | 4/2004 | Silverbrook et al. |
| 6,725,426 B1 | 4/2004 | Pavlov |
| 6,728,755 B1 | 4/2004 | de Ment |
| 6,735,721 B1 | 5/2004 | Morrow et al. |
| 6,745,367 B1 | 6/2004 | Bates et al. |
| 6,748,385 B1 | 6/2004 | Rodkin et al. |
| 6,748,569 B1 | 6/2004 | Brooke et al. |
| 6,751,777 B2 | 6/2004 | Bates et al. |
| 6,754,874 B1 | 6/2004 | Richman |
| 6,757,826 B1 | 6/2004 | Paltenghe |
| 6,757,868 B1 | 6/2004 | Glaser et al. |
| 6,760,723 B2 | 7/2004 | Oshinsky et al. |
| 6,763,343 B1 | 7/2004 | Brooke et al. |
| 6,772,139 B1 | 8/2004 | Smith, III |
| 6,772,165 B2 | 8/2004 | O'Carroll |
| 6,774,928 B2 | 8/2004 | Bruzzone |
| 6,779,154 B1 | 8/2004 | Nussbaum et al. |
| 6,781,609 B1 | 8/2004 | Barker et al. |
| 6,799,299 B1 | 9/2004 | Li et al. |
| 6,801,929 B1 | 10/2004 | Donoho et al. |
| 6,816,849 B1 | 11/2004 | Halt, Jr. |
| 6,828,992 B1 | 12/2004 | Freeman et al. |
| 6,845,380 B2 | 1/2005 | Su et al. |
| 6,845,499 B2 | 1/2005 | Srivastava et al. |
| 6,847,387 B2 | 1/2005 | Roth |
| 6,848,078 B1 | 1/2005 | Birsan et al. |
| 6,850,895 B2 | 2/2005 | Brodersen et al. |
| 6,871,220 B1 | 3/2005 | Rajan et al. |
| 6,871,345 B1 | 3/2005 | Crow et al. |
| 6,874,130 B1 | 3/2005 | Baweja et al. |
| 6,876,996 B2 | 4/2005 | Czajkowski et al. |
| 6,883,168 B1 | 4/2005 | James et al. |
| 6,889,359 B1 | 5/2005 | Conner et al. |
| 6,901,403 B1 | 5/2005 | Bata et al. |
| 6,915,454 B1 | 7/2005 | Moore et al. |
| 6,925,609 B1 | 8/2005 | Lucke |
| 6,931,532 B1 | 8/2005 | Davis et al. |
| 6,941,510 B1 | 9/2005 | Ozzie et al. |
| 6,941,511 B1 | 9/2005 | Hind et al. |
| 6,941,521 B2 | 9/2005 | Lin et al. |
| 6,948,129 B1 | 9/2005 | Loghmani |
| 6,948,133 B2 | 9/2005 | Haley |
| 6,948,135 B1 | 9/2005 | Ruthfield et al. |
| 6,950,980 B1 | 9/2005 | Malcolm |
| 6,950,987 B1 | 9/2005 | Hargraves et al. |
| 6,957,395 B1 | 10/2005 | Jobs et al. |
| 6,961,897 B1 | 11/2005 | Peel, Jr. et al. |
| 6,963,875 B2 | 11/2005 | Moore et al. |
| 6,968,503 B1 | 11/2005 | Chang et al. |
| 6,968,505 B2 | 11/2005 | Stoll et al. |
| 6,993,714 B2 | 1/2006 | Kaler et al. |
| 6,993,722 B1 | 1/2006 | Greer et al. |
| 6,996,776 B1 | 2/2006 | Makely et al. |
| 6,996,781 B1 | 2/2006 | Myers et al. |
| 7,000,179 B2 | 2/2006 | Yankovich et al. |
| 7,002,560 B2 * | 2/2006 | Graham ..................... 345/179 |
| 7,003,548 B1 | 2/2006 | Barck et al. |
| 7,003,722 B2 | 2/2006 | Rothchiller et al. |
| 7,010,580 B1 | 3/2006 | Fu et al. |
| 7,020,869 B2 | 3/2006 | Abriari et al. |
| 7,024,417 B1 | 4/2006 | Russakovsky et al. |
| 7,032,170 B2 | 4/2006 | Poulose |
| 7,036,072 B1 | 4/2006 | Sulistio et al. |
| 7,039,875 B2 | 5/2006 | Khalfay et al. |
| 7,043,687 B2 | 5/2006 | Knauss et al. |
| 7,051,273 B1 | 5/2006 | Holt et al. |
| 7,058,663 B2 | 6/2006 | Johnston et al. |
| 7,062,764 B2 | 6/2006 | Cohen et al. |
| 7,065,493 B1 | 6/2006 | Homsi |
| 7,076,728 B2 | 7/2006 | Davis et al. |
| 7,080,083 B2 | 7/2006 | Kim et al. |
| 7,080,325 B2 | 7/2006 | Treibach-Heck et al. |
| 7,081,882 B2 | 7/2006 | Sowden et al. |
| 7,086,009 B2 | 8/2006 | Resnick et al. |
| 7,086,042 B2 | 8/2006 | Abe et al. |
| 7,088,374 B2 | 8/2006 | David et al. |
| 7,100,147 B2 | 8/2006 | Miller et al. |
| 7,103,611 B2 | 9/2006 | Murthy et al. |
| 7,106,888 B1 | 9/2006 | Silverbrook et al. |
| 7,107,282 B1 | 9/2006 | Yalamanchi |
| 7,107,521 B2 | 9/2006 | Santos |
| 7,107,539 B2 | 9/2006 | Abbott et al. |
| 7,120,863 B1 | 10/2006 | Wang |
| 7,130,885 B2 | 10/2006 | Chandra et al. |
| 7,143,341 B1 | 11/2006 | Kohli |
| 7,146,564 B2 | 12/2006 | Kim et al. |
| 7,152,205 B2 | 12/2006 | Day et al. |
| 7,168,035 B1 | 1/2007 | Bell et al. |
| 7,178,166 B1 | 2/2007 | Taylor et al. |
| 7,190,376 B1 | 3/2007 | Tonisson |
| 7,191,394 B1 | 3/2007 | Ardeleanu et al. |
| 7,200,816 B2 | 4/2007 | Falk et al. |
| 7,213,200 B2 | 5/2007 | Abe et al. |
| 7,236,982 B2 | 6/2007 | Zlatanov et al. |
| 7,237,114 B1 | 6/2007 | Rosenberg |
| 7,249,328 B1 | 7/2007 | Davis |
| 7,272,789 B2 | 9/2007 | O'Brien |
| 7,281,018 B1 | 10/2007 | Begun et al. |
| 7,281,245 B2 | 10/2007 | Reynar et al. |
| 7,284,208 B2 | 10/2007 | Matthews |
| 7,287,218 B1 | 10/2007 | Knotz et al. |
| 7,296,017 B2 | 11/2007 | Larcheveque et al. |
| 7,313,758 B2 | 12/2007 | Kozlov |

| Patent/Pub No. | Date | Name |
|---|---|---|
| 7,316,003 B1 | 1/2008 | Dulepet et al. |
| 7,318,237 B2 | 1/2008 | Moriconi et al. |
| 7,334,178 B1 | 2/2008 | Stanciu et al. |
| 7,337,391 B2 | 2/2008 | Clarke et al. |
| 7,337,392 B2 | 2/2008 | Lue |
| 7,346,840 B1 | 3/2008 | Ravishankar et al. |
| 7,346,848 B1 | 3/2008 | Ruthfield et al. |
| 7,370,066 B1 | 5/2008 | Sikchi et al. |
| 7,373,595 B2 | 5/2008 | Jones et al. |
| 7,376,673 B1 | 5/2008 | Chalecki et al. |
| 7,412,649 B2 | 8/2008 | Emek et al. |
| 7,424,671 B2 | 9/2008 | Elza et al. |
| 7,428,699 B1 | 9/2008 | Kane et al. |
| 7,441,200 B2 | 10/2008 | Savage |
| 7,496,632 B2 | 2/2009 | Chapman et al. |
| 7,496,837 B1 | 2/2009 | Larcheveque et al. |
| 7,543,228 B2 | 6/2009 | Kelkar et al. |
| 7,549,115 B2 | 6/2009 | Kotler et al. |
| 7,584,417 B2 | 9/2009 | Friend et al. |
| 2001/0007109 A1 | 7/2001 | Lange |
| 2001/0016880 A1 | 8/2001 | Cai et al. |
| 2001/0022592 A1 | 9/2001 | Alimpich et al. |
| 2001/0024195 A1 | 9/2001 | Hayakawa |
| 2001/0037345 A1 | 11/2001 | Kiernan et al. |
| 2001/0044850 A1 | 11/2001 | Raz et al. |
| 2001/0051928 A1 | 12/2001 | Brody |
| 2001/0054004 A1 | 12/2001 | Powers |
| 2001/0056411 A1 | 12/2001 | Lindskog et al. |
| 2001/0056429 A1 | 12/2001 | Moore et al. |
| 2001/0056460 A1 | 12/2001 | Sahota et al. |
| 2002/0010743 A1 | 1/2002 | Ryan et al. |
| 2002/0010746 A1 | 1/2002 | Jilk et al. |
| 2002/0010855 A1 | 1/2002 | Reshef et al. |
| 2002/0013788 A1 | 1/2002 | Pennell et al. |
| 2002/0019941 A1 | 2/2002 | Chan et al. |
| 2002/0023113 A1 | 2/2002 | Hsing et al. |
| 2002/0026441 A1 | 2/2002 | Kutay et al. |
| 2002/0026461 A1 | 2/2002 | Kutay et al. |
| 2002/0032590 A1 | 3/2002 | Anand et al. |
| 2002/0032692 A1 | 3/2002 | Suzuki et al. |
| 2002/0032706 A1 | 3/2002 | Perla et al. |
| 2002/0032768 A1 | 3/2002 | Voskuil |
| 2002/0035579 A1 | 3/2002 | Wang et al. |
| 2002/0035581 A1 | 3/2002 | Reynar et al. |
| 2002/0040469 A1 | 4/2002 | Pramberger |
| 2002/0052769 A1 | 5/2002 | Navani et al. |
| 2002/0053021 A1 | 5/2002 | Rice et al. |
| 2002/0054126 A1 | 5/2002 | Gamon |
| 2002/0057297 A1 | 5/2002 | Grimes et al. |
| 2002/0065798 A1 | 5/2002 | Bostleman et al. |
| 2002/0065847 A1 | 5/2002 | Furukawa et al. |
| 2002/0070973 A1 | 6/2002 | Croley |
| 2002/0078074 A1 | 6/2002 | Cho et al. |
| 2002/0078103 A1 | 6/2002 | Gorman et al. |
| 2002/0083145 A1 | 6/2002 | Perinpanathan |
| 2002/0083148 A1 | 6/2002 | Shaw et al. |
| 2002/0083318 A1 | 6/2002 | Larose |
| 2002/0091738 A1 | 7/2002 | Rohrabaugh et al. |
| 2002/0099952 A1 | 7/2002 | Lambert et al. |
| 2002/0100027 A1 | 7/2002 | Binding et al. |
| 2002/0107885 A1* | 8/2002 | Brooks et al. ............... 707/505 |
| 2002/0111699 A1 | 8/2002 | Melli et al. |
| 2002/0111932 A1 | 8/2002 | Roberge et al. |
| 2002/0112224 A1 | 8/2002 | Cox |
| 2002/0129056 A1 | 9/2002 | Conant |
| 2002/0133484 A1 | 9/2002 | Chau et al. |
| 2002/0152222 A1 | 10/2002 | Holbrook |
| 2002/0152244 A1 | 10/2002 | Dean et al. |
| 2002/0156772 A1 | 10/2002 | Chau et al. |
| 2002/0156846 A1 | 10/2002 | Rawat et al. |
| 2002/0156929 A1 | 10/2002 | Hekmatpour |
| 2002/0169752 A1 | 11/2002 | Kusama et al. |
| 2002/0169789 A1 | 11/2002 | Kutay et al. |
| 2002/0174147 A1 | 11/2002 | Wang et al. |
| 2002/0174417 A1 | 11/2002 | Sijacic et al. |
| 2002/0178187 A1 | 11/2002 | Rasmussen et al. |
| 2002/0184188 A1 | 12/2002 | Mandyam et al. |
| 2002/0184219 A1 | 12/2002 | Preisig et al. |
| 2002/0184485 A1 | 12/2002 | Dray, Jr. et al. |
| 2002/0188597 A1 | 12/2002 | Kern et al. |
| 2002/0188613 A1 | 12/2002 | Chakraborty et al. |
| 2002/0194219 A1 | 12/2002 | Bradley et al. |
| 2002/0196281 A1 | 12/2002 | Audleman et al. |
| 2002/0196288 A1 | 12/2002 | Emrani |
| 2002/0198891 A1 | 12/2002 | Li et al. |
| 2002/0198935 A1 | 12/2002 | Crandall, Sr. et al. |
| 2003/0004951 A1 | 1/2003 | Chokshi |
| 2003/0007000 A1 | 1/2003 | Carlson et al. |
| 2003/0014397 A1 | 1/2003 | Chau et al. |
| 2003/0018668 A1 | 1/2003 | Britton et al. |
| 2003/0020746 A1 | 1/2003 | Chen et al. |
| 2003/0023641 A1 | 1/2003 | Gorman et al. |
| 2003/0025732 A1 | 2/2003 | Prichard |
| 2003/0028550 A1 | 2/2003 | Lee et al. |
| 2003/0037303 A1 | 2/2003 | Bodlaender et al. |
| 2003/0038788 A1 | 2/2003 | Demartines et al. |
| 2003/0043986 A1 | 3/2003 | Creamer et al. |
| 2003/0046665 A1 | 3/2003 | Ilin |
| 2003/0048301 A1 | 3/2003 | Menninger |
| 2003/0051243 A1 | 3/2003 | Lemmons et al. |
| 2003/0055811 A1 | 3/2003 | Stork et al. |
| 2003/0055828 A1 | 3/2003 | Koch et al. |
| 2003/0056198 A1 | 3/2003 | Al-Azzawe et al. |
| 2003/0061386 A1 | 3/2003 | Brown |
| 2003/0061567 A1 | 3/2003 | Brown et al. |
| 2003/0084424 A1 | 5/2003 | Reddy et al. |
| 2003/0110443 A1 | 6/2003 | Yankovich et al. |
| 2003/0120578 A1 | 6/2003 | Newman |
| 2003/0120651 A1 | 6/2003 | Bernstein et al. |
| 2003/0120659 A1 | 6/2003 | Sridhar |
| 2003/0120671 A1 | 6/2003 | Kim et al. |
| 2003/0120686 A1 | 6/2003 | Kim et al. |
| 2003/0126555 A1 | 7/2003 | Aggarwal et al. |
| 2003/0128196 A1 | 7/2003 | Lapstun et al. |
| 2003/0135825 A1 | 7/2003 | Gertner et al. |
| 2003/0140132 A1 | 7/2003 | Champagne et al. |
| 2003/0140160 A1 | 7/2003 | Raz et al. |
| 2003/0142072 A1* | 7/2003 | Lapstun et al. ............... 345/158 |
| 2003/0149934 A1 | 8/2003 | Worden |
| 2003/0158897 A1 | 8/2003 | Ben-Natan et al. |
| 2003/0163285 A1 | 8/2003 | Nakamura et al. |
| 2003/0167277 A1 | 9/2003 | Hejlsberg et al. |
| 2003/0172113 A1 | 9/2003 | Cameron et al. |
| 2003/0182268 A1 | 9/2003 | Lal |
| 2003/0182327 A1 | 9/2003 | Ramanujam et al. |
| 2003/0187756 A1 | 10/2003 | Klivington et al. |
| 2003/0187930 A1 | 10/2003 | Ghaffar et al. |
| 2003/0188260 A1 | 10/2003 | Jensen et al. |
| 2003/0189593 A1 | 10/2003 | Yarvin |
| 2003/0192008 A1 | 10/2003 | Lee |
| 2003/0200506 A1 | 10/2003 | Abe et al. |
| 2003/0204481 A1 | 10/2003 | Lau |
| 2003/0204511 A1 | 10/2003 | Brundage |
| 2003/0204814 A1 | 10/2003 | Elo et al. |
| 2003/0205615 A1 | 11/2003 | Marappan |
| 2003/0210428 A1 | 11/2003 | Bevlin et al. |
| 2003/0212664 A1 | 11/2003 | Breining et al. |
| 2003/0212902 A1 | 11/2003 | van der Made |
| 2003/0217053 A1 | 11/2003 | Bachman et al. |
| 2003/0218620 A1 | 11/2003 | Lai et al. |
| 2003/0225469 A1 | 12/2003 | DeRemer et al. |
| 2003/0225768 A1 | 12/2003 | Chaudhuri |
| 2003/0225829 A1 | 12/2003 | Pena et al. |
| 2003/0226132 A1 | 12/2003 | Tondreau et al. |
| 2003/0233374 A1 | 12/2003 | Spinola et al. |
| 2003/0233644 A1 | 12/2003 | Cohen et al. |

| | | | | | | |
|---|---|---|---|---|---|---|
| 2003/0236859 A1 | 12/2003 | Vaschillo et al. | | 2005/0055627 A1 | 3/2005 | Lloyd et al. |
| 2003/0236903 A1 | 12/2003 | Piotrowski | | 2005/0060324 A1 | 3/2005 | Johnson et al. |
| 2003/0237046 A1 | 12/2003 | Parker et al. | | 2005/0060647 A1 | 3/2005 | Doan et al. |
| 2003/0237047 A1 | 12/2003 | Borson | | 2005/0060721 A1 | 3/2005 | Choudhary et al. |
| 2004/0002939 A1 | 1/2004 | Arora | | 2005/0065933 A1 | 3/2005 | Goering |
| 2004/0002950 A1 | 1/2004 | Brennan et al. | | 2005/0065936 A1 | 3/2005 | Goering |
| 2004/0003031 A1 | 1/2004 | Brown et al. | | 2005/0066287 A1 | 3/2005 | Tattrie et al. |
| 2004/0003353 A1 | 1/2004 | Rivera et al. | | 2005/0071752 A1 | 3/2005 | Marlatt |
| 2004/0003389 A1 | 1/2004 | Reynar et al. | | 2005/0076049 A1 | 4/2005 | Qubti et al. |
| 2004/0010752 A1 | 1/2004 | Chan et al. | | 2005/0091285 A1 | 4/2005 | Krishnan et al. |
| 2004/0015783 A1 | 1/2004 | Lennon et al. | | 2005/0091305 A1 | 4/2005 | Lange et al. |
| 2004/0024842 A1 | 2/2004 | Witt | | 2005/0097536 A1 | 5/2005 | Bernstein et al. |
| 2004/0030991 A1 | 2/2004 | Hepworth et al. | | 2005/0102370 A1 | 5/2005 | Lin et al. |
| 2004/0039881 A1 | 2/2004 | Shoebridge et al. | | 2005/0102612 A1 | 5/2005 | Allan et al. |
| 2004/0039990 A1 | 2/2004 | Bakar et al. | | 2005/0108104 A1 | 5/2005 | Woo |
| 2004/0039993 A1 | 2/2004 | Kougiouris et al. | | 2005/0108624 A1 | 5/2005 | Carrier |
| 2004/0044961 A1 | 3/2004 | Pesenson | | 2005/0114757 A1 | 5/2005 | Sahota et al. |
| 2004/0044965 A1 | 3/2004 | Toyama et al. | | 2005/0114764 A1 | 5/2005 | Gudenkauf et al. |
| 2004/0046789 A1 | 3/2004 | Inanoria | | 2005/0132043 A1 | 6/2005 | Wang et al. |
| 2004/0054966 A1 | 3/2004 | Busch et al. | | 2005/0132196 A1 | 6/2005 | Dietl |
| 2004/0059754 A1 | 3/2004 | Barghout et al. | | 2005/0138031 A1 | 6/2005 | Wefers |
| 2004/0073565 A1 | 4/2004 | Kaufman et al. | | 2005/0138086 A1 | 6/2005 | Pecht-Seibert |
| 2004/0073868 A1 | 4/2004 | Easter et al. | | 2005/0138539 A1 | 6/2005 | Bravery et al. |
| 2004/0078756 A1 | 4/2004 | Napper et al. | | 2005/0149375 A1 | 7/2005 | Wefers |
| 2004/0083426 A1 | 4/2004 | Sahu | | 2005/0149726 A1 | 7/2005 | Joshi et al. |
| 2004/0088647 A1 | 5/2004 | Miller et al. | | 2005/0160398 A1 | 7/2005 | Bjornson et al. |
| 2004/0088652 A1 | 5/2004 | Abe et al. | | 2005/0171746 A1 | 8/2005 | Thalhammer-Reyero |
| 2004/0093596 A1 | 5/2004 | Koyano | | 2005/0198086 A1 | 9/2005 | Moore |
| 2004/0107367 A1 | 6/2004 | Kisters | | 2005/0198125 A1 | 9/2005 | Beck et al. |
| 2004/0117769 A1 | 6/2004 | Lauzon et al. | | 2005/0198247 A1 | 9/2005 | Perry et al. |
| 2004/0123277 A1 | 6/2004 | Schrader et al. | | 2005/0210263 A1 | 9/2005 | Levas et al. |
| 2004/0139400 A1 | 7/2004 | Allam et al. | | 2005/0223063 A1 | 10/2005 | Chang et al. |
| 2004/0146199 A1 | 7/2004 | Berkner et al. | | 2005/0223320 A1 | 10/2005 | Brintzenhofe et al. |
| 2004/0148178 A1 | 7/2004 | Brain | | 2005/0246304 A1 | 11/2005 | Knight et al. |
| 2004/0148514 A1 | 7/2004 | Fee et al. | | 2005/0257148 A1 | 11/2005 | Goodman et al. |
| 2004/0148571 A1 | 7/2004 | Lue | | 2005/0262112 A1 | 11/2005 | Moore |
| 2004/0162741 A1 | 8/2004 | Flaxer et al. | | 2005/0268217 A1 | 12/2005 | Garrison |
| 2004/0163041 A1 | 8/2004 | Engel | | 2005/0268222 A1 | 12/2005 | Cheng |
| 2004/0163046 A1 | 8/2004 | Chu et al. | | 2006/0010386 A1 | 1/2006 | Khan |
| 2004/0172442 A1 | 9/2004 | Ripley | | 2006/0020586 A1 | 1/2006 | Prompt et al. |
| 2004/0181543 A1 | 9/2004 | Wu et al. | | 2006/0026500 A1 | 2/2006 | Qa 'Im-maqami' |
| 2004/0181711 A1 | 9/2004 | Johnson et al. | | 2006/0026534 A1 | 2/2006 | Ruthfield et al. |
| 2004/0186762 A1 | 9/2004 | Beaven et al. | | 2006/0031757 A9 | 2/2006 | Vincent, III |
| 2004/0189716 A1 | 9/2004 | Paoli et al. | | 2006/0036995 A1 | 2/2006 | Chickles et al. |
| 2004/0194035 A1 | 9/2004 | Chakraborty | | 2006/0041838 A1 | 2/2006 | Khan |
| 2004/0205473 A1 | 10/2004 | Fisher et al. | | 2006/0059107 A1 | 3/2006 | Elmore et al. |
| 2004/0205525 A1 | 10/2004 | Murren et al. | | 2006/0059434 A1 | 3/2006 | Boss et al. |
| 2004/0205534 A1 | 10/2004 | Koelle | | 2006/0069605 A1 | 3/2006 | Hatoun |
| 2004/0205571 A1 | 10/2004 | Adler | | 2006/0069985 A1 | 3/2006 | Friedman et al. |
| 2004/0205592 A1 | 10/2004 | Huang | | 2006/0075245 A1 | 4/2006 | Meier |
| 2004/0205605 A1 | 10/2004 | Adler et al. | | 2006/0080657 A1 | 4/2006 | Goodman |
| 2004/0205653 A1 | 10/2004 | Hadfield et al. | | 2006/0085409 A1 | 4/2006 | Rys et al. |
| 2004/0205671 A1 | 10/2004 | Sukehiro et al. | | 2006/0101037 A1 | 5/2006 | Brill et al. |
| 2004/0210599 A1 | 10/2004 | Friedman et al. | | 2006/0101051 A1 | 5/2006 | Carr et al. |
| 2004/0210645 A1 | 10/2004 | Kouznetsov et al. | | 2006/0107206 A1 | 5/2006 | Koskimies |
| 2004/0216084 A1 | 10/2004 | Brown et al. | | 2006/0129978 A1 | 6/2006 | Abriari et al. |
| 2004/0221238 A1 | 11/2004 | Cifra et al. | | 2006/0136422 A1 | 6/2006 | Matveief et al. |
| 2004/0221245 A1 | 11/2004 | Chickles et al. | | 2006/0143220 A1 | 6/2006 | Spencer, Jr. |
| 2004/0237030 A1 | 11/2004 | Malkin | | 2006/0161559 A1 | 7/2006 | Bordawekar et al. |
| 2004/0260593 A1 | 12/2004 | Abraham-Fuchs et al. | | 2006/0161837 A1 | 7/2006 | Kelkar et al. |
| 2004/0261019 A1 | 12/2004 | Imamura et al. | | 2006/0184393 A1 | 8/2006 | Ewin et al. |
| 2004/0268229 A1 | 12/2004 | Paoli et al. | | 2006/0200754 A1 | 9/2006 | Kablesh et al. |
| 2005/0004893 A1 | 1/2005 | Sangroniz | | 2006/0248468 A1 | 11/2006 | Constantine et al. |
| 2005/0005248 A1 | 1/2005 | Rockey et al. | | 2007/0005611 A1 | 1/2007 | Takasugi et al. |
| 2005/0015279 A1 | 1/2005 | Rucker | | 2007/0050719 A1 | 3/2007 | Lui et al. |
| 2005/0015732 A1 | 1/2005 | Vedula et al. | | 2007/0074106 A1 | 3/2007 | Ardeleanu |
| 2005/0022115 A1 | 1/2005 | Baumgartner et al. | | 2007/0088554 A1 | 4/2007 | Harb et al. |
| 2005/0050066 A1 | 1/2005 | Hughes | | 2007/0094589 A1 | 4/2007 | Paoli |
| 2005/0027757 A1 | 2/2005 | Kiessig et al. | | 2007/0100877 A1 | 5/2007 | Paoli |
| 2005/0028073 A1 | 2/2005 | Henry et al. | | 2007/0101280 A1 | 5/2007 | Paoli |
| 2005/0033626 A1 | 2/2005 | Kruse et al. | | 2007/0118538 A1 | 5/2007 | Ahern et al. |
| 2005/0033728 A1 | 2/2005 | James | | 2007/0118803 A1 | 5/2007 | Walker et al. |
| 2005/0038711 A1 | 2/2005 | Marlelo | | 2007/0130500 A1 | 6/2007 | Rivers-Moore et al. |

| | | | |
|---|---|---|---|
| 2007/0130504 | A1 | 6/2007 | Betancourt et al. |
| 2007/0186157 | A1 | 8/2007 | Walker et al. |
| 2007/0208606 | A1 | 9/2007 | MacKay et al. |
| 2007/0208769 | A1 | 9/2007 | Boehm et al. |
| 2007/0276768 | A1 | 11/2007 | Pallante |
| 2008/0028340 | A1 | 1/2008 | Davis |
| 2008/0126402 | A1 | 5/2008 | Sitchi et al. |
| 2009/0070411 | A1 | 3/2009 | Chang et al. |
| 2009/0119580 | A1 | 5/2009 | Rohrabaugh et al. |
| 2009/0177961 | A1 | 7/2009 | Fortini et al. |

FOREIGN PATENT DOCUMENTS

| | | |
|---|---|---|
| EP | 0961197 | 12/1999 |
| EP | 1076290 | 2/2001 |
| EP | 1221661 | 7/2002 |
| JP | 63085960 | 4/1988 |
| JP | 401173140 A | 7/1989 |
| JP | 3191429 | 8/1991 |
| JP | 4225466 | 8/1992 |
| JP | 5314152 | 11/1993 |
| JP | 406014105 | 1/1994 |
| JP | 6139241 | 5/1994 |
| JP | 6180697 | 6/1994 |
| JP | 6180698 | 6/1994 |
| JP | 10171662 | 6/1998 |
| JP | 10-2207805 | 8/1998 |
| JP | 10207805 | 8/1998 |
| JP | 2000132436 | 5/2000 |
| JP | 2002183652 | 6/2002 |
| JP | 2003173288 | 6/2003 |
| WO | WO 99/24945 | 5/1999 |
| WO | WO 99/56207 | 11/1999 |
| WO | WO 01/44934 | 6/2001 |
| WO | WO0157720 | 9/2006 |

OTHER PUBLICATIONS

Raggett, "HTML Tables", retrieved on Aug. 6, 2006, at <<http:www://is-edu.hcmuns.edu.vn/WebLib/books/Web/Tel/html3-tables.html>>, W3C Internet Draft, Jul. 7, 1995, pp. 1-12.
"Webopedia Computer Dictionary" retrieved on May 9, 2006, at <<http://www.pewebopedia.com/TERM/O/OLE.html>>, Jupitermedia Corporation, 2006, pp. 07.
Grosso, et al., "XML Fragment Interchange", W3C,(Feb. 2001),1-28.
Altova, et al., "User and Reference Manual Version 4.4", www.xmlspy.com, (May 24, 2007),1-565.
"XForm 1.0", W3C,(Jul. 16, 2001).
U.S. Appl. No. 60/209,713, Kutay et al.
U.S. Appl. No. 60/191,662, Moore et al.
U.S. Appl. No. 60/203,081, Ben-Natan et al.
"Architecture for a Dynamic Information Area Control" IBM Technical Disclosure Bulletin IBM Corp. New York US vol. 37 No. 10 Jan. 10, 1994. pp. 245-246.
Alschuler Liora "A tour of Xmetal" O'Reilly XML.COM 'Online Jul. 14, 1999 XP002230081 retrieved from the internet: <URL:http://www.xml.com/pub/a/SeyboldReport/ip0311025.html> retrieved on Feb. 5, 2003.
Au Irene et al. "Netscape Communicator's Collapsible Toolbars" CHI'98 Human Factors in Computing Systems Conference Proceedings Los Angeles CA Apr. 18-23, 1998 pp. 81-86.
Battle Steven A. et al.; "Flexible Information Presentation with XML" 1998 The Institution of Electrical Engineers 6 pages.
Brogden William; "Arbortext Adept 8 Editor Review" O'Reilly XML.COM 'Online! Sep. 22, 1999 XP002230080 retrieved from the Internet <URL:http://www.xml.com/pub/a/1999/09/adept/AdeptRvw.htm> retrieved on Feb. 5, 2003.
Chen Yi et al.: A; "XKvalidator: A Constraint Validator for XML" CIKM '-2 Nov. 4-9, 2002 Copyright 2002 ACM 1-58113-492-4/02/0011 pp. 446-452.
Ciancarini Paolo et al.; "Managing Complex Documents Over the WWW: A Case Study for XML" IEEE Transactions on Knowledge and Data Engineering Vo.l. 11 No. 4 Jul./Aug. 1999. pp. 629-938.

Davidow Ari: Alle; "XML Editors: Allegations of Functionality in search of reality" Internet 'Online! 1999 XP002230082 retrieved from the Internet <URL:http://www.ivritype.com/xml/>.
Kanemoto Hirotaka et al; "An Efficiently Updatable Index Scheme for Structured Documents" 1998 IEEE pp. 991-996.
Sutanthavibul Supoj et al.; "XFIG Version 3.2 Patchlevel 2 (Jul. 2, 1998) Users Manual (Edition 1.0)" Internet Document [Online] Jul. 2, 1998 XP002229137 Retrieved from the Internet: <URL:http://www.ice.mtu.edu/online_docs/xfig332/> [retrieved on Jan. 28, 2003].
Usdin Tommie et al.; Not a; "XML: Not a Silver Bullet But a Great Pipe Wrench" Standardview vol. 6. No. 3 Sep. 1998 pp. 125-132.
Chien Shu-Yao et al.; "Efficient Management of Multiversion Documents by Object Referencing" Proceedings of the 27th VLDB Conference 2001 pp. 291-300.
Chien Shu-Yao et al.; "Efficient schemes for managing mulitversion XML documents" VLDB Journal (2002) pp. 332-352.
Chien Shu-Yao et al.; "Storing and Querying Multiversion XML Documents using Durable Node Numbers" IEEE 2002 pp. 232-241.
Chien Shu-Yao et al.; "XML Document Versioning" SIGMOD Record vol. 30 No. 3 Spet. 2001 pp. 46-53.
Dyck Timothy; "XML Spy Tops as XML Editor" http://www.eweek.com/article2/0395972404100.asp Nov. 25, 2002 4 pages.
Haukeland Jan-Henrick; "Tsbiff—tildeslash biff——version 1.2.1" Internet Document [Online] Jun. 1999 URL: http://web.archive.org/web/19990912001527/http://www.tildeslash.com/tsbiff/.
Nelson Mark; "Validation with MSXML and XML Schema" Windows Developer Magazine Jan. 2002 pp. 35-38.
Netscape Communication Corpora; "Netscape Communicator 4.61 for OS/2 Warp" Software 1999 The whole software release & "Netscape—Version 4.6 [en]-010615" Netscape Screenhot Oct. 2, 2002.
Noore A.; "A secure conditional access system using digital signature and encryption" 2003 Digest of Technical Papers. International Conference on Consumer Electronics Jun. 2003 pp. 220-221.
Rogge et al.; "Validating MPEG-21 Encapsulated Functional Metadata" IEEE 2002 pp. 209-212.
Wong Raymond K. et al.; "Managing and Querying Multi-Version XML Data with Update Logging" DocEng '02 Nov. 8-9, 2002 Copyright 2002 ACM 1-58113-594-7/02/0011 pp. 74-81.
Cheng Ya Bing et al; "Designing Valid XML Views" ER 2002 LNCS 2503 2002 Springer-Verlag Berlin Heidelberg 2002 pp. 463-477.
Chuang Tyng-Ruey; "Generic Validation of Structural Content with Parametric Modules" ICFP '01 Sep. 3-5, 2001 Copyright 2001 ACM 1-58113-415-0/01/0009 pp. 98-109.
Dayton Linnea and Jack Davis; "Photo Shop 5/5.5 WOW! Book" 2000 Peachpit Press pp. 8-17.
Hall Richard Scott; "Agent-based Software Configuration and Deployment" Thesis of the Univeristy of Colorado Online Dec. 31, 1999 retrieved from the Internet on Nov. 7, 2003: <http://www.cs.colorado.edu/users/rickhall/documents/ThesisFinal.pdf> 169 pages.
Hardy Mathew R. B. et al; "Mapping and Displaying Structural Transformations between XML and PDF" DocEng '02 Nov. 8-9, 2002 Copyright 2002 ACM 1-58113-597-07/02/0011 pp. 95-102.
Kim Sang-Kyun et al.; "Immediate and Partial Validation Mechanism for the Conflict Resolution of Update Operations in XML Databases" WAIM 2002 LNCS 2419 2002 pp. 387-396 Springer-Veriag Berlin Heidelberg 2002.
Netscape Communication Corp; "SmartUpdate Developers Guide" Online Mar. 11, 1999 retrieved from the Internet on Dec. 8, 2000: <http://developer.netscape.com:80/docs/manuals/communicator/jarman/index.htm> 83 pages.
Tomimori et al.; "An Efficient and Flexible Access Control Framework for Java Programs in Mobile Terminals"; 22nd International Conference on Distributed Computing Systems Workshops; 2002; pp. 777-782.
Van Hoff Arthur et al.; "The Open Software Description Format" Online Aug. 13, 1997 retrieved from the Internet on Nov. 7, 2003: <http://www.w3.org/TR/NOTE-OSD> 11 pages.
Verlamis Iraklis et al.; "Bridging XML-Schema and relational databases. A System for generating and manipulating relational databases using valid XML documents." DocEng '01 Nov. 9-10, 2001 Copyright 2001 ACM 1-58113-432-0/01/0011 pp. 105-114.

Williams Sara and Charlie Kin; "The Component Object Model" A Technical Overview Oct. 1994 Microsoft Corp. pp. 1-14.
Pacheco et al., "Delphi 5 Developers Guide," Sams Publishing, 1999, Chapter 31 Section: Data Streaming, 6 pages.
"Netscape window," Netscape Screenshot Oct. 2, 2002.
Clarke P., "From small beginnings" Knowledge Management Nov. 2001, pp. 28-30.
Hwang et al., "Micro-Firewalls for Dynamic Network Security with Distributed Intrusion Detection"; IEEE International Symposium on Network Computing and Applications; 2001; pp. 68-79.
Kaiya et al., "Specifying Runtime Environments and Functionalities of Downloadable Components Under the Sandbox Mode"; International Symposium on Principles of Software Evolution; 2000; pp. 138-142.
Komatsu N. et al., "A Proposal on Digital Watermark in Document Image Communication and Its Application to Realizing a Signature" Electronics and Communications in Japan Part I: Communications vol. 73 No. 5, May 1990, pp. 22-33.
Sun Q. et al., "A robust and secure media signature scheme for JPEG images" Proceedings of 2002 IEEE Workshop on Multimedia Signal Processing, Dec. 2002, pp. 296-299.
Prevelakis et al., "Sandboxing Applications"; Proceedings of the FREENIX Track; 2001; pp. 119-126.
Schmid et al., "Protection Data from Malicious Software"; 18th Annual Computer Security Applications Conference; 2002; pp. 199-208.
Trupin J., "The Visual Programmer," Microsoft Systems Journal, Apr. 1996, pp. 103-105.
Zdonik S., "Object Management System Concepts," ACM, 1984, pp. 13-19.
"Store and Organize Related Project Files in a Binder," Getting Results with Microsoft Office, 1990, pp. 109-112.
Barker et al., "Creating In-Line Objects Within An Integrated Editing Environment," IBM Technical Disclosure Bulletin, vol. 27, No. 5, Oct. 1984, p. 2962.
Berg A., "Naming and Binding: Monikers" Inside OLE, 1995, Chapter 9, pp. 431-490.
Clapp D., "The NeXT Application Kit Part I: Non-Responsive Classes," The NeXT Bible 1990, Chapter 16, pp. 275-293.
DiLascia et al., "Sweeper" Microsoft Interactive Developer, vol. 1, No. 1, 1996, 27 pages.
Herzner et al., " CDAM- Compound Document Access and Management. An Object-Oriented Approach" Multimedia Systems Interaction and Applications, 1992, Chapter 3, pp. 17-36.
Kobayashi et al., "An Update on BTRON-specification OS Development" IEEE 1991 pp. 132-140.
Peterson B. , "Unix Variants," Unix Review, vol. 10, No. 4, Apr. 1992, pp. 29-31.
Pike et al., "Plan 9 from Bell Labs" UKUUG, Summer 1990, 10 pages.
Pike et al., "The Use of Name Spaces in Plan 9," Operating Systems Review vol. 27, No. 2, Apr. 1993, pp. 72-76.
Staneck W., "Internal and External Media" Electronic Publishing Unleashed, 1995, Chapter 22, pp. 510-542.
Clark James—W3C Editor; "XSL Transformation (XSLT) Verison 1.0" Nov. 16, 1999 W3C (MIT INRIA Kejo) pp. 1-156.
Description of Whitehill Composer software product producted by Whitehill Technologies Inc. available at <http://www.xml.com/pub/p/221> accessed on Apr. 8, 2004, two pages.
McCright J.S.; "New Tool Kit to Link Groove with Microsoft Sharepoint" eWeek Enterprise News & Reviews Ziff Davis Media INc. Jul. 29, 2002 1 page.
Musgrave S; "Networking technology—impact and opportunities" Survey and Statistical Computing 1996. Proceedings of the Second ASC International Conference. Sep. 1996. pp. 369-378. London UK.
Rapaport L; "Get more from SharePoint" Transform Magazine vol. 11 No. 3. Mar. 2002 pp. 1315.
W3C Editor James Clark and Ste; "XML Path Language (XPath) Version 1.0" Nov. 16, 1999W3C (MIT INRIA Kejo) pp. 1-49.
OMG XML Metadata Interchange (XMI) Specification Version 1.2 Jan. 2002.
"Microsoft Word 2000 Screenshots", (2000),11-17.
XmlSpy, "XmlSpy 2004 Enterprise Edition Manual", Altova,(May 17, 2004),1-25, 220-225.
StylusStudio, "StylusStudio: XPath Tools", 2004-2007, StylusStudio,1-14.
Dodds, "Toward an XPath API", xml.com,(May 7, 2001),1-3.
Altova, "Altova Tools for XPath 1.0/2.0", Altova,1-12.
"Microsoft Word 2000 Screenshots", Word,(2000),1-17.
Pacheco, Xavier et al., "Delphi 5 Developers Guide", Sams Publishing. Chapter 31, Section: Data Streaming,(1999),4.
Atova, "User Reference manual Version 4.4, XML Spy suite 4.4," Atova Ges.m.b.H and Altova, Inc., May 24, 2002, pages cover, copyright p. 1-565.
Altova et al. XML Spy, XML integrated Development Environments, Altova Inc., 2002, pp. 1-18.
Ben-Natan, U.S. Appl. No. 60/203,081, filed May 9, 2000, entitled "Internet platform for creating and supporting communities".
Ixia Soft, "Steamlining content creation, retrieval, and publishing on the Web using TEXTML Server and SML Spy 4 Suite in an integrated, Web publishing environment," (Partner's Whitepaper, published on the Web as of Jun. 6, 2002, downlowad pp. 1-16.
Kutay, U.S. Appl. No. 60/209,713, filed Jun. 5, 2000, entitled, "Methods and systems for accessing, organizing presenting and viewing data".
Microsoft Word 2000 (see Screen Shot "About Microsoft Word") Published 1983-1999 and Microsoft Excel 2000 (see Screen Shot "About Microsoft Excel") Published 1988-1999, Three pages.
Moore, U.S. Appl. No. 60/191,662, filed Mar. 23, 2000, entitled "Collection-based presistent digital archives".
Bradley, Neil "The XML Companion, Third Edition", Published by *Addison Wesley Professional*, http://proquest.safaribooksonline.com0201770598, http,(Dec. 12, 2001),1-18.
Klarlund, Nils "DSD: A Schema Language for XML", *ACM, FSMP* Portland Oregon, (2000),101-111.
Watt, Andrew "Microsoft Office Infopath 2003 Kick Start", (Published by *Sams*) Print ISBN-10:0-672-32623-X, (Mar. 24, 2004),1-57.
Hu, et al., "A Programmable Editor for Developing Structured Documents based on Bidirectional Transformations", ACM,(Aug. 2004),178-179.
Borland, Russo "Running Microsoft Word 97", 314-315, 338, 361-362, 390, and 714-719.
"Microsoft Word 2000", Screenshots,(1999),1-5.
Beauchemin, Dave "Using InfoPath to Create Smart Forms", Retrieved from the Internet at http:/www.microsoft.com/office/infopath/prodinfo/using.mspx on Jan. 21, 2007,(Mar. 27, 2003).
Begun, Andrew et al., "Support and Troubleshooting for XML Schemas in InfoPath 2003", *Microsoft Office InfoPath 2003 Technical Articles*, Retrieved from the Internet at http://msdn2.microsoft.com/en-us/library/aa168241(office.11,d=printer).aspx on Jan. 21, 2007,(Aug. 2004).
Dubinko, Micah "XForms and Microsoft InfoPath", Retrieved from the Internet at http://www.xml.com/lpt/a/1311 on Jan. 21, 2007,(Oct. 29, 2003).
Udell, Jon "InfoPath and XForms", Retrieved from the Internet at http://weblog.infoworld.com/udell/2003/02/26.html,(Feb. 26, 2003).
Hoffman, Michael "Architecture of Microsoft Office InfoPath 2003", *Microsoft Office InfoPath 2003 Technical Articles*, Retrieved from the Internet at http://msdn2.microsoft.com/en-us/library/aa219024(office.11,d=printer).aspx on Jan. 21, 2007,(Jun. 2003).
Singh, Darshan "Microsoft InfoPath 2003 by Example", Retrieved from the Internet at http://www.perfectxml.com/InfoPath.asp on Jan. 21, 2007,(Apr. 20, 2003).
Raman, T. V., et al., "XForms 1.0", (Dec. 2001),Section 1-12.2.3 & Appendices A-G.
"Enter Key", Retrieved from the Internet at http://systems.webopedia.com/TERM/Enter_key.html on Dec. 20, 2006.
Lehtonen, Miro et al., "A Dynamic User Interface for Document Assembly", Department of Computer Science, University of Helsinki,(Nov. 2002).
Rees, Michael J., "Evolving the Browser Towards a Standard User Interface Architecture", School of Information Technology, Bond University, Australia,(2001).

"Microsoft Visual Basic 5.0 Programmers Guide", *Microsoft Press*, (1997),pp. 42-43, 54-58.

Nelson, Joe "Client-side Form Validation Using JavaScript", *Developer Advisory*, (Sep. 21, 2001).

Brabrand, et al., "Power Forms Declarative Client-side Form Field Validation", (2002),1-20.

Anat, Eyal et al., "Integrating and Customizing Hererogeneous E-Commerce Applications", The VLDB Journal—The International Journal on Very Large Data Bases, vol. 10, Issue 1,(Aug. 2001),16-38.

Adams, Susie et al., "BizTalk Unleashed", Sams publishing, 2002, first printing Mar. 2001,(Mar. 2001),1-2, 31-138.

Vasters, Clemens F., "BizTalk Server 2000 A Beginner's Guide", Osborne/McGraw-Hill,(2001),1-2, 359-402.

Halberg, Bruce et al., "Using Microsoft Excel 97", (1997),191-201, 213-219.

Villard, et al., "An Incremental XSLT Transformation Processor for XML Document Manipulation", http://www2002.org/CDROM/refereed/321, Printed on May 18, 2007,(May 2002),25 pages.

Laura Acklen & Read Gilgen, "Using Corel Wordperfect 9", 251-284, 424-434, 583-586 (1998).

Bruce Halberg et al, "Using Microsoft Excel 97", Published 1997, Bestseller Edition, Pertinent pp. 1-9, 18-25, 85-89, 98-101, 106-113, 124-127, 144-147, 190-201, 209-210, 218-227, 581-590, 632-633, 650-655, 712-714.

Leblond et al, "PC Magazine Guide to Quattro Pro for Windows", pp. 9-11, 42-61, Ziff-Davis Press, Copyright 1993 by the LeBlond Group.

Mansfield, "Excel 97 for Busy People", Published by Osborne/Mcgraw-Hill 1997 pp. 48-50.

"Microsoft Visual Basic 5.0 Programmer's Guide 1997"; pp. 578-579; Redmond WA 98052-6399.

Han et al., WebSplitter: A Unified XML Framework for Multi-Device Collaborative Web Browsing, 2000, ACM Conference on Cimputer Supported Cooperative Work, 10 pages.

IBM: Stack Algorithm for Extractin Subtree from Serialized Tree, Mar. 1, 1994, TDB-ACC-NONN94033, 3 pages.

Bray, Tim "Extensible Markup Language (XML)", http://www.textuality.com/sgml-erb/WD-xml.html, second named inventor Jean Paoli, third named inventor C.M. Sperberg-McQueen,(Feb. 10, 1998),37 Pages.

Kay, Michael "XSL Transformations (XSLT) Version 2.0", http://www.w3.org/TR/2005/WD-xslt20-20050404, (04/205),1-374.

Altova, Inc., "XML Spy 4.0 Manual," Altova Inc. & Altova GmbH, coyright 1998-2001, Chapters 1, 2, and 6, encompassing pp. 1-17, 18-90, and 343-362.

Cybook, Inc.: "Copying the Search Form to Services-based Web Sites" INternet Article, (online) Jul. 26, 2004.the whole document.

Excel Developer Tip (hereinafter "Excel"), "Determining the Data Type of a Cell", May 13, 1998, p. 1 (available at http://jwalk.com/ss//excel/tips/tip62.htm).

Macromedia, Inc.: "Dreamweaver Technote, Changes in copying and pasting in Dreamweaver 4" Internet Article (online). the whole document, Mar. 12, 2001.

Rado, Dave: "How to create a template that makes it easy for users to "fill in the blanks", without doing any programming" Microsoft Word MVP FAQ Site, (online) Apr. 30, 2004, the whole document.

Microsoft Corporation, "Microsoft Computer Dictionary" Microsoft Press, Fifth Edition, p. 149, May 1, 2002.

"Notice of Allowance", U.S. Appl. No. 10/404,312, (Jan. 12, 2009),12 pages.

"Final Office Action", U.S. Appl. No. 10/857,689, (Jan. 6, 2009),23 pages.

"Non Final Office Action", U.S. Appl. No. 10/977,198, (Feb. 2, 2009),15 pages.

"Non Final Office Action", U.S. Appl. No. 10/939,588, (Feb.18, 2009),40 pages.

"Non Final Office Action", U.S. Appl. No. 10/976,451, (Feb. 23, 2009),39 pages.

"Non final Office Action", U.S. Appl. No. 11/234,767, (Feb. 26, 2009),37 pages.

"Notice of Allowance", U.S. Appl. No. 11/167,514, (Mar. 11, 2009),6 pages.

"Non Final Office Action", U.S. Appl. No. 10/942,528, (Mar. 6, 2009),31 pages.

"Non Final Offfice Action", U.S. Appl. No. 11/170,521, (Jan. 21, 2009),86 pages.

"Foreign Office Action", Application Serial No. 2,412,611, (Feb. 9, 2009),6 pages.

"Foreign Office Action", Application Serial No. 200610003709.2, (Jan. 9, 2009),8 pages.

Hall, Richard S., "Agent-based Software Configuration and Development", http://www.doc.ic.ac.uk/~alw/edu/theses/hall-phd-0599.pdf on Jun. 8, 2009, Thesis of the University of Colorado,(May 1, 1999), 182 pages.

"Notice of Allowance", U.S. Appl. No. 10/988,718, (Apr. 9, 2009).

"Final Office Action", U.S. Appl. No. 11/107,347, (Apr. 2, 2009),15 pages.

"Non Final Office Action", U.S. Appl. No. 10/988,720, (Apr. 2, 2009),19 pages.

"Final Office Action", U.S. Appl. No. 11/044,106, (Apr. 13, 2009),20 pages.

"Final Office Action", U.S. Appl. No. 11/056,500, (Apr. 16, 2009),10 pages.

"Non Final Office Action", U.S. Appl. No. 10/955,666, (May 7, 2009),28 pages.

"Non Final Office Action", U.S. Appl. No. 10/876,433, (Apr. 24, 2009),62 pages.

"Non Final Office Action", U.S. Appl. No. 10/916,692, (Apr. 30, 2009),14 pages.

"HP Blade Sever BH Series Operating System Guide", Hewlett-Packard (Jul. 2002).

"Non Final Office Action", U.S. Appl. No. 09/599,809, (May 13, 2009).

"Non FInal Office Action", U.S. Appl. No. 11/295,178, May 27, 2009.

"Non Final Office Action", U.S. Appl. No. 10/990,152, May 28, 2009.

"Final Office Action", U.S. Appl. No. 11/036,910, (Jun. 1, 2009),15 pages.

"Non Final Office Action", U.S. Appl. No. 10/857,689, (Jun. 11, 2009),25 pages.

"Non FInal Office Action", U.S. Appl. No. 11/095,254, (Jun. 8, 2009),21 pages.

"Final Office Action", U.S. Appl. No. 11/234,767, 24 pages, Jun. 3, 2009.

"Foreign Office Action", Application Serial No. 2002-503702, Final Notice of Rejection,(Jun. 5, 2009).

Kaori, Iwantani et al., "Perfect Manual of Clarisworks 4.0 for Macintosh", 1st Edition, Japan,(07/297),pp. 153-167.

Noriko, Matsushita "Step-up Training of Clarisworks (tabulation), Successful Use of Spreadsheet and Tabulation", Mac People, vol. 4, No. 19,(Oct. 1, 1998),pp. 138-139.

Akihiro, Senda "Word 2000, Conservative- Looking but 'Attentive' New Function", Nikkei PC 21, vol. 4, No. 8,(Aug. 1, 1999),pp. 115-116.

Yasuji, Fukuhara "Clarisworks, Introduction to Business Document Construction, No. 4, Estimate", Nikkei MAC, No. 14,(May 17, 1994),pp. 197-204.

Acklen, et al., "Special Edition, Using Corel WordPerfect 9", Que Corporation,,(Jun. 1999),65 pages.

"Final Office Action", U.S. Appl. No. 10/976,451, (Jul. 2, 2009),13 pages.

Reagan, Moore W., et al., "Collection-based persistent digital archives", U.S. Appl. No. 60/191,662, filed Mar. 23, 2000, 133.

"Foreign Office Action", Application Serial No. 200610051554.X, (Jul. 10, 2009),11 pages.

"Non-Final Office Action", U.S. Appl. No. 11/234,767, (Aug. 12, 2009),24 Pages.

"Final Office Action", U.S. Appl. No. 10/977,198, (Aug. 19, 2009),15 pages.

"Non-Final Office Action", U.S. Appl. No. 10/939,588, (Aug. 27, 2009),28 pages.

"Final Office Action", U.S. Appl. No. 11/170,521, (Sep. 8, 2009),12 pages.

"Final Office Action", U.S. Appl. No. 10/402,640, (Aug. 28, 2009),17 pages.

"Final Office Action", U.S. Appl. No. 10/942,528, (Sep. 17, 2009),27 pages.

"Non-Final Office Action", U.S. Appl. No. 11/107,347, (Sep. 17, 2009),9 pages.

"Notice of Allowance", U.S. Appl. No. 10/988,720, (Sep. 17, 2009),18 pages.

"Non-Final Office Action", U.S. Appl. No. 11/044,106, (Sep. 24, 2009),17 pages.

"Non-Final Office Action", U.S. Appl. No. 11/567,149, (Sep. 8, 2009),5 pages.

"Final Office Action", U.S. Appl. No. 10/955,666, (Oct. 14, 2009),24 pages.

"Advisory Action", U.S. Appl. No. 10/942,528, (Oct. 26, 2009),3 pages.

"Non-Final Office Action", U.S. Appl. No. 11/557,931, (Oct. 20, 2009),27 pages.

"Non-Final Office Action", U.S. Appl. No. 10/976,451, (Oct. 29, 2009),14 pages.

Webopedia, "Definition of OLE", Retrieved from: <http://www.webopedia.com/TERM/O/OLE.html>, (May 16, 1998),3 pages.

Webopedia, "Definition of OpenDoc", Retrieved from: <http://www.webopedia.com/TeRM/O/OpenDoc.html>, (Sep. 18, 1997),3 pages.

Webopedia, "Definition of Network", Retrieved from: <http://www.webopedia.com/TERM/n/network.html>, (Sep. 1, 1996),2 pages.

Van Hoff, Arthur et al., "The Open Software Description Format", Retrieved from: <www.w3.org/TR/NOTE-OSD> on Nov. 7, 2003, (Aug. 13, 1997),11 pages.

"Final Office Action", U.S. Appl. No. 10/916,692, (Nov. 16, 2009),10 pages.

"Final Office Action", U.S. Appl. No. 11/218,149, (Nov. 16, 2009),18 pages.

"Final Office Action", U.S. Appl. No. 11/072,087, (Nov. 16, 2009),9 pages.

"Non-Final Office Action", U.S. Appl. No. 11/036,910, (Nov. 13, 2009),9 pages.

"Notice of Allowance", U.S. Appl. No. 11/095,254, (Nov. 18, 2009),8 pages.

"Foreign Office Action", Mexican Patent Application No. PA/a/2006/002493, (Sep. 14, 2009), 5 pages.

"Notice of Allowance", U.S. Appl. No. 10/942,528, (Dec. 3, 2009), 8 pages.

"Non-Final Office Action", U.S. Appl. No. 11/170,521, (Dec. 17, 2009),11 pages.

"Notice of Allowance", U.S. Appl. No. 10/990,152, (Dec. 21, 2009),6 pages.

Honkala, Mikko et al., "Multimodal Interaction with XForms", *ICWE '06*, (2006),pp. 201-208.

"Final Office Action", U.S. Appl. No. 11/295,178, (Dec. 24, 2009),38 pages.

"Non-Final Office Action", U.S. Appl. No. 10/402,640, (Dec. 30, 2009),16 pages.

"Non-Final Office Action", U.S. Appl. No. 12/021,894, (Dec. 31, 2009),10 pages.

"Non-Final Office Action", U.S. Appl. No. 11/218,149, (Jan. 14, 2010),15 Pages.

"Foreign Office Action", Application Serial No. 200610051544.X, (Dec. 4, 2009),9 pages.

"Notice of Allowance", U.S. Appl. No. 11/056,500, (Dec. 2, 2009),17 pages.

* cited by examiner

Meeting Agenda

Meeting Subject:

Meeting Organizer:   Start Date: 5/7/2003   Start Time:

Location:   End Date: 5/7/2003   End Time:

108

300

Meeting Agenda

Meeting Subject:

302

Meeting Organizer:   Start Date: 5/7/2003   Start Time:

Location:   End Date: 5/7/2003   End Time:

SYSTEMS AND METHODS FOR HANDWRITING TO A SCREEN

TECHNICAL FIELD

This invention relates to handwriting made to screens.

BACKGROUND

Many computing devices, such as hand-held computers, PDAs, and Palm Pilots™, enable users to enter text and commands by handwriting over the device's screen. Ink recognition software can convert this handwriting into text or a command that the device can understand.

Prior to enabling handwriting into a particular data-entry field, these devices often require that a user independently select the data-entry field into which the handwriting text is to be entered. A user can select the data-entry field with a writing gesture called "tapping", after which the device can enable handwriting of text into the selected data-entry field. This and similar requirements make these devices less intuitive and hence, more difficult for new users to use. That is, many users are most comfortable with handwriting on a paper medium, not computing devices. The more user-intuitive paper medium does not require a user to tap a field on a page in order to write into that field.

As noted above, once a data-entry field is selected on a computing device, such as by "tapping" on the field, the device typically enables a user to enter text into the selected data-entry field. To guide the user's handwriting, some devices have a screen area, often a narrow rectangle at the bottom, into which a user can write. Handwriting made into this writing area can be entered as text into the data-entry field. This writing area, however, can be geographically unassociated with the data-entry field into which the user is attempting to enter text. That is, in many systems, this writing area is limited to a particular geographic location, while the data-entry field can be anywhere on the screen.

This disjoint or non-logical association between the data-entry field and where the user actually writes can reduce the user's ability to mentally retain the field's context. The user may want to view or otherwise ascertain the information currently in or surrounding the data-entry field when handwriting in the writing area. To view or ascertain such information, the user may have to change his or her focus from the writing area to the data-entry field and its context. Needless to say, this can be distracting.

Additionally, the area allotted for handwriting can be quite small. Especially for devices with fairly small screens, having a small portion of that screen for handwriting can make handwriting difficult. A small area, for example, can make it difficult for a user to write large enough for ink recognition software to convert the handwriting to text. And, a small area can restrict how much a user can write at once, potentially slowing or causing the user to lose his or her train of thought.

Some other computing devices enable a user to enter text into a previously selected data-entry field by handwriting anywhere over the device's screen. Allowing a user to write anywhere on a screen can cause numerous problems. First, it can confuse users because the location at which the user writes can be geographically unassociated with the field, thus facilitating a user's forgetting which field was originally selected. Once the user begins to write, for instance, they can get distracted and mentally lose track of the selected field. Second, when a user is not given guidance in terms of acceptable character size, he or she may write too large or too small. A user may, for instance, attempt to write or cram everything inside a data-entry field that may simply be too small to accommodate all that the user intends to write. Small handwriting can be difficult for ink recognition software to recognize and may also be a strain on the user. On the other hand, handwriting that is too large can cause a user to run out of room on the screen. Third, allowing users to write anywhere can permit them to write at an angle which, in turn, may cause ink recognition software problems insofar as the ability to recognize tilted handwriting is concerned.

Still other computing devices can enable a user to enter text into a previously selected data-entry field via a pop-up window. When a user selects the data-entry field, the device can pop up a window, usually just below the field. This pop-up window, however, can obscure part of the screen. By so doing, the window can obscure features and information that a user might need. For example, if a user wants to write notes for a 9 a.m. meeting into his or her day-timer and needs to concurrently see what he or she has to do at 10 a.m., for instance, the pop-up window may prevent the user from seeing this information by obscuring the 10 a.m. field.

SUMMARY

Systems and methods are described that enable handwriting into a data-entry field on a computing device's screen without independently selecting that data-entry field. In some embodiments, these systems and methods provide a handwriting guide geographically associated with a data-entry field into which a user is intending to write that permits substantially all features of a computing device's screen to be viewed.

BRIEF DESCRIPTION OF THE DRAWINGS

FIG. 3 illustrates an exemplary data-entry form and screen shot, the screen shot showing the data-entry form after handwriting has been received and displayed.

The same numbers are used throughout the disclosure and figures to reference like components and features.

DETAILED DESCRIPTION

Overview

Systems and methods ("tools") described below can, in at least some embodiments, enable a user to write text into a data-entry field on a computing device's screen without independently selecting that data-entry field. These tools can determine, based on a user's handwriting, a data-entry field in which to enter the handwriting. Enabling users to write into data-entry fields without independently selecting a field can make their experience more intuitive and user-friendly.

The tools can also, in some embodiments, provide a handwriting guide capable of guiding a user's handwriting. The handwriting guide is geographically associated with a data-entry field into which the user is intending to write. In at least some embodiments, the handwriting guide permits substantially all features of a computing device's screen to be viewed during the act of writing. The handwriting guide can help a user keep track of the field, guide the user's handwriting so that it can more easily be read by ink recognition software, and permit the user to view information on the screen.

Exemplary Architecture

Figure 1:
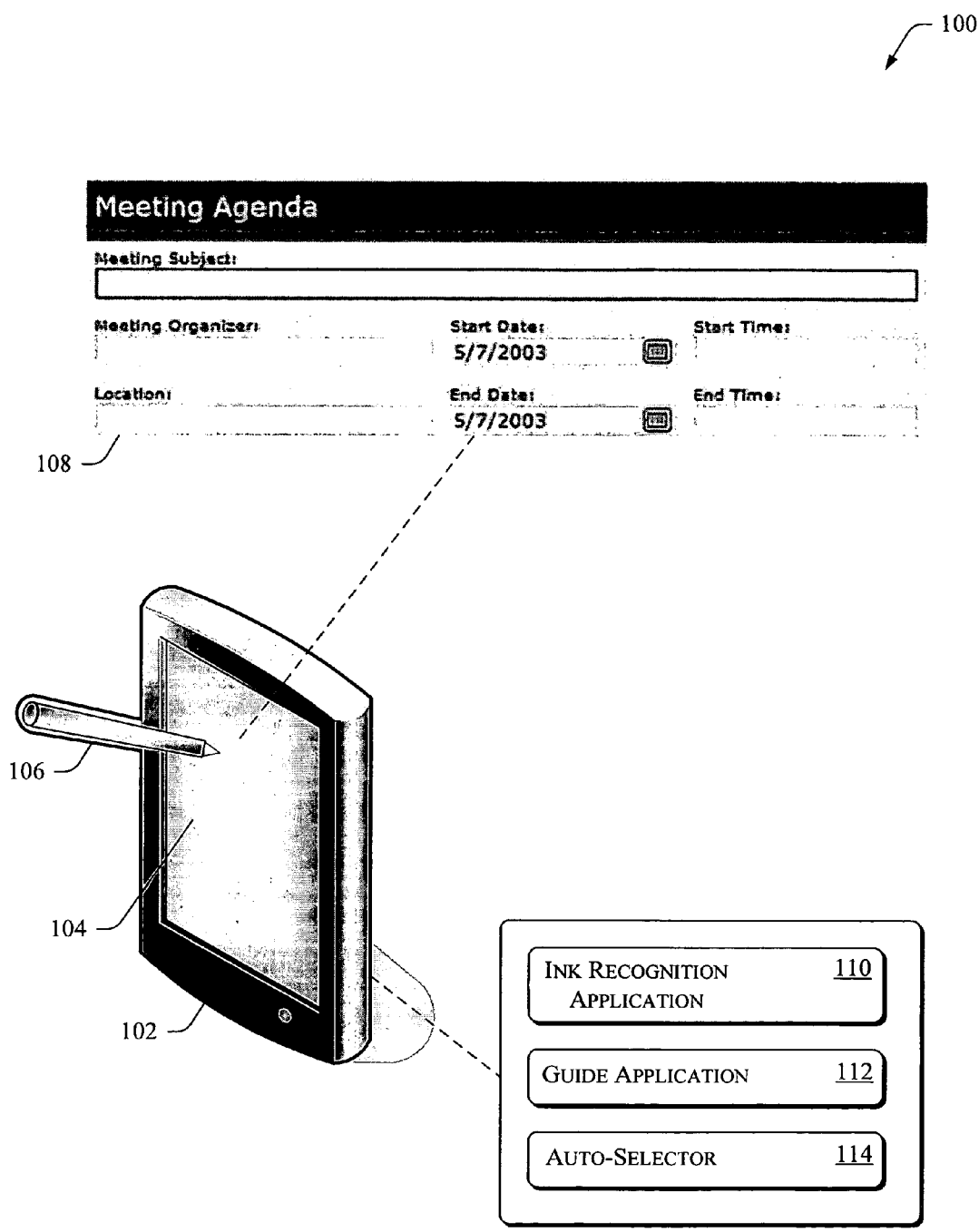
FIG. 1 illustrates an exemplary architecture having a computing device and exemplary applications.

Referring to FIG. 1, an exemplary system/architecture 100 is shown having an exemplary computing device 102, tablet screen 104, stylus 106, data-entry form 108, ink recognition application 110, guide application 112, and auto-selector 114. This architecture 100 and its components are shown to aid in discussing the tools but are not intended to limit their scope or applicability.

The computing device comprises hardware and software capable of communicating with or executing the ink recognition application, the guide application, and/or the auto-selector. The computing device is also capable of communicating with a user through the tablet screen. The tablet screen is capable of presenting the data-entry form to a user and receiving input from the user, such as through the user handwriting over the tablet screen with the stylus.

The ink recognition application is capable of converting handwriting into text or commands recognizable by the computing device, the guide application, or the auto-selector. The guide application and the auto-selector can operate separately or in combination and comprise computer-readable media executable by a computing device, such as computing device 102, that perform various acts described below.

Enabling a User to Write into a Field

Figure 2:
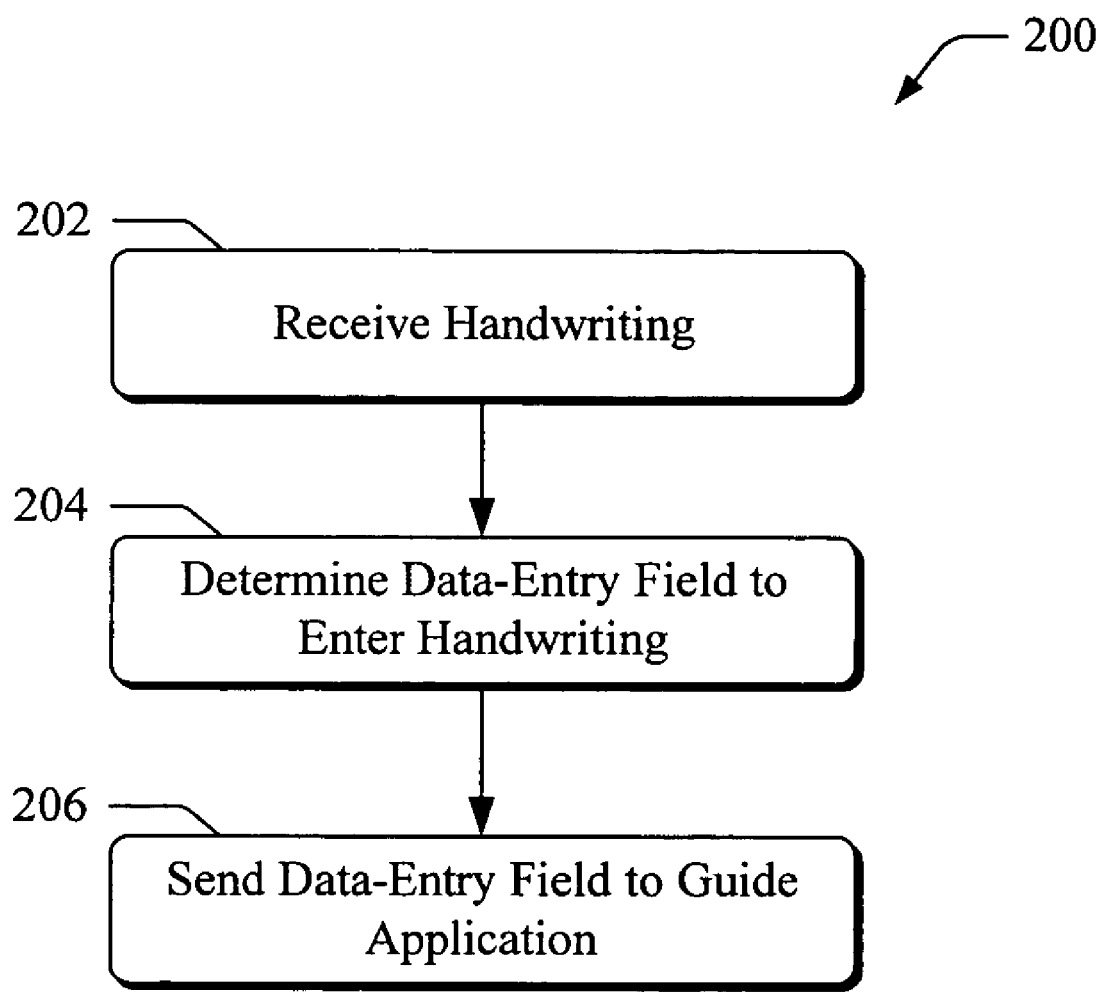
FIG. 2 sets forth a flow diagram of an exemplary process for enabling a user to write into a data-entry field.

Referring to FIG. 2, an exemplary process 200 for enabling a user to write into a data-entry field is shown. The process 200 is illustrated as a series of blocks representing individual operations or acts performed by auto-selector 114. This and other processes described herein may be implemented in any suitable hardware, software, firmware, or combination thereof. In the case of software and firmware, these processes represent sets of operations implemented as computer-executable instructions.

At block 202, the auto-selector receives handwriting indicia. This handwriting indicia can comprise indicia for handwriting strokes recognizable as text input from a user, such as a character or word. The auto-selector can receive the handwriting indicia from various devices or software, such as directly from tablet screen 104 or through ink recognition application 110.

As an example, consider FIG. 3. There, data-entry form 108 and a screen shot 300 showing the data-entry form after handwriting 302 has been received and displayed over the form is shown. Here, the handwriting is a single stylus stroke received from a user through tablet screen 104. In another embodiment, the handwriting is received from a user through another device, such as a light pen or a mouse that enables handwriting to be made to a screen without necessarily requiring a user to handwrite over that screen. The received stroke is part of a character rather than a gesture, as will become apparent below. A gesture, as used in this document, constitutes a non-writing-based input from a user that is recognizable as a command rather than text. For example, the "tap" described in the Background section above is one example of a gesture.

At block 204 (FIG. 2), the auto-selector determines, responsive to the handwriting received, a data-entry field in which to enter the handwriting. The auto-selector can determine which data-entry field to enter the handwriting based on a geographic relation between the handwriting and the data-entry field. This geographic relation can be based on which data-entry field the handwriting intersects, which it intersects first or most often if there are multiple fields intersected, which field is closest to the handwriting, and the like. Alternately or additionally, a small or first-received portion of the handwriting, such as the first stroke or character, can be analyzed to determine in which field to enter the handwriting. By so doing, the auto-selector can determine the field more quickly than if it waits to receive multiple strokes or characters.

Figure 4:
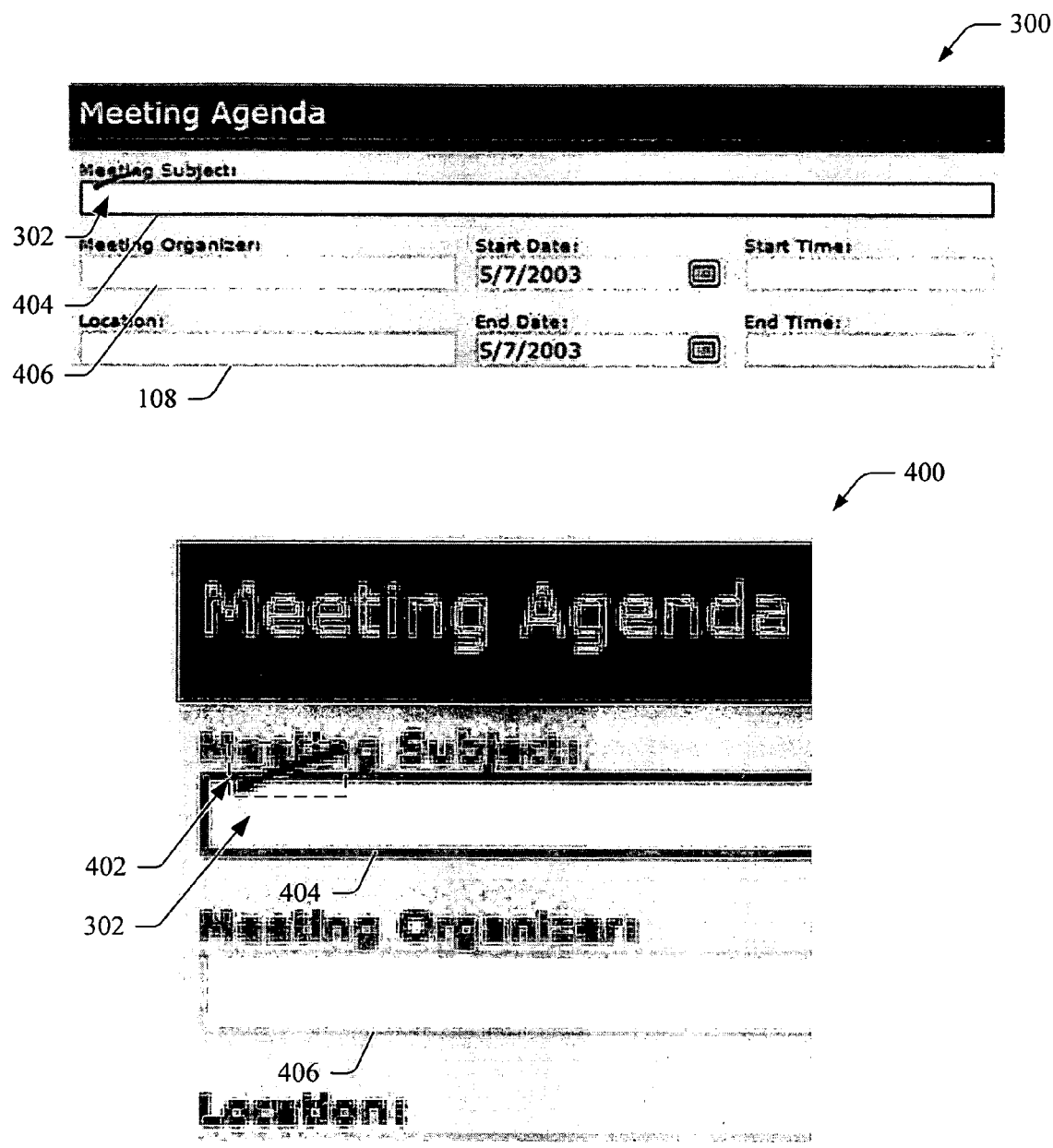
FIG. 4 illustrates the exemplary screen shot of FIG. 3 and a blow-up of the screen shot showing handwriting.

Continuing the illustrated example, FIG. 4 shows screen shot 300 of FIG. 3 and an enlarged portion 400 of the screen shot which shows handwriting 302. In this illustrated example, the auto-selector determines a data-entry field in which to enter the handwriting based on the first stroke made by a user. In the illustrated and described embodiment, the auto-selector employs a bounding-type algorithm to assist in making this determination.

As but one example of a bounding-type algorithm, consider the following. First, the auto-selector computes a bounding shape 402 for the handwriting. In this particular example, the bounding shape comprises a rectangle—although any suitable shape can be used. Second, the auto-selector compares the bounded writing area occupied by the bounding rectangle against areas occupied by data-entry fields of data-entry form 108, such as a meeting subject field 404 and a meeting organizer field 406. In one embodiment, the auto-selector compares the bounding rectangle only against fields' geometries that are configured to accept text and which are currently viewable by the user. In the illustrated example, about forty percent of the bounding rectangle overlaps with the area occupied by the meeting subject field and no area overlaps with the meeting organizer field. Third, the auto-selector compares the overlapping areas, picking the field with the largest overlap (here the meeting subject field). If there is no overlap with a field, the auto-selector can pick the field closest to the bounding rectangle or use additional handwriting and perform the algorithm again.

Returning to FIG. 2, at block 206, the auto-selector can communicate which data-entry field was picked at block 204 to another application, such as guide application 112. In the illustrated example, the auto-selector communicates to the guide application that the meeting subject field is determined to be the data-entry field into which the handwriting should be entered. The guide application can indicate to a user that the meeting subject field is picked, such as by highlighting the field or presenting a handwriting guide in physical proximity to the field. These and other ways in which the guide application can use this information are set forth in greater detail below.

This process and the auto-selector enable a user to enter text into a field by handwriting alone, rather than having to select a data-entry field first before beginning to write. Also, as part of this process, the handwriting used to determine into which field the handwriting should be entered can itself be entered into that field; this is efficient because an action of a user is not wasted.

Exemplary Handwriting Guide

Figure 5:
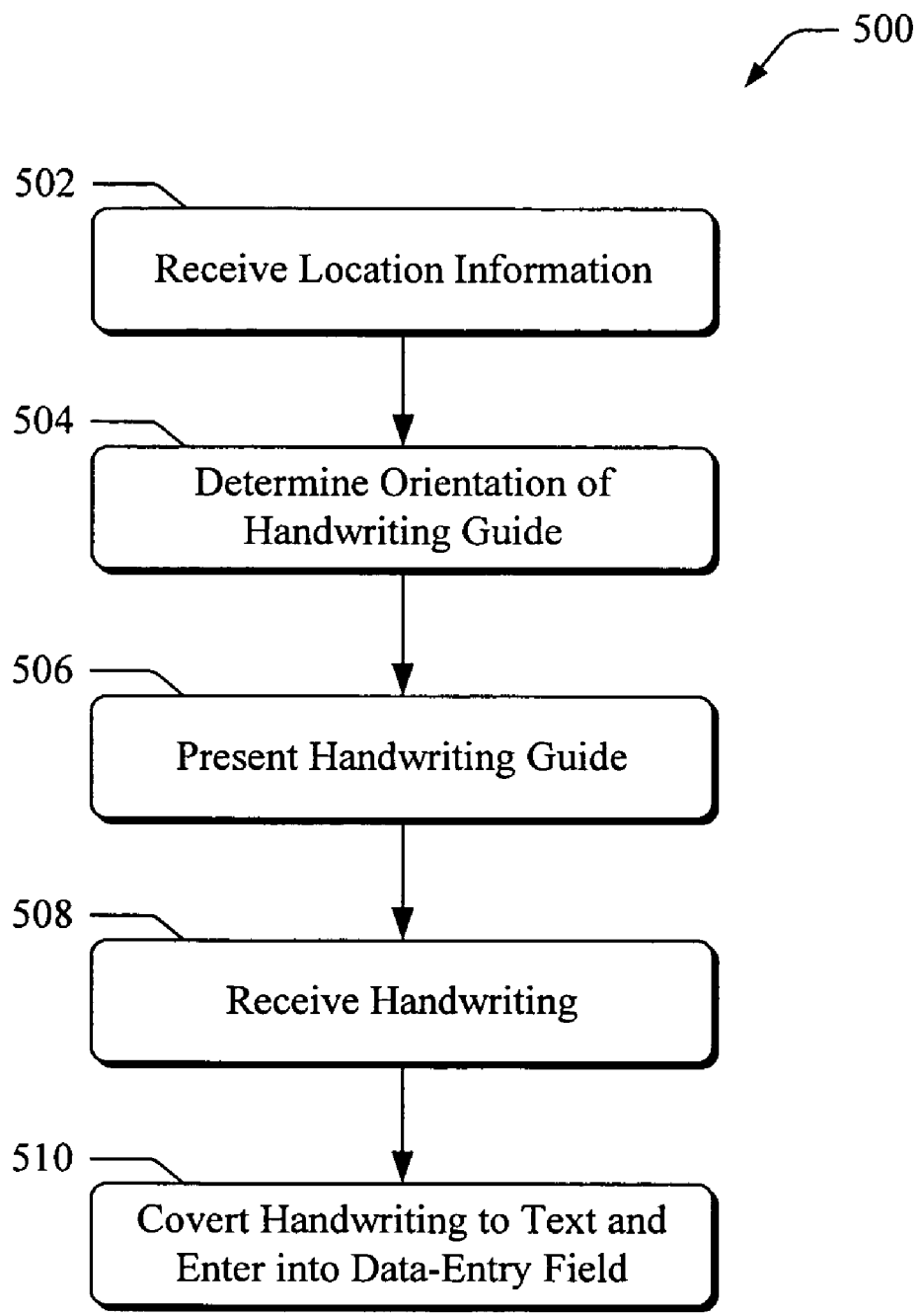
FIG. 5 sets forth a flow diagram of an exemplary process for presenting and generating a handwriting guide.

Referring to FIG. 5, an exemplary process 500 for presenting and generating a handwriting guide is shown. This process is illustrated as a series of blocks representing individual operations or acts performed by guide application 1112 and/or other components of architecture 100.

At block 502, the guide application receives location information. This information can comprise an indication of where on a screen handwriting is displayed, where handwriting has begun, an identity of a data-entry field, and/or a location of a data-entry field. In cases where the guide application receives an identity of a data-entry field, the guide application can analyze the screen and the data-entry form to determine where the data-entry field is located. In the illustrated example, the guide application receives from auto-selector 114 an indication that meeting subject field 404 (FIG. 4) is being written in by the user.

At block 504, the guide application determines, responsive to the location information, an orientation for a handwriting guide. If, for instance, the guide application receives an indication of where on a screen handwriting has begun, the guide application can orient the handwriting guide to encompass part or all of the handwriting.

If the guide application receives information indicating a data-entry field and a location where handwriting has begun, the guide application can present the handwriting guide based on the location information, the data-entry field, or both. The guide application, for instance, can receive location information indicating a selected data-entry field and entry of handwriting at a location not near the selected data-entry field. This can happen when a user selects a data-entry field with a gesture, like a tap, but then handwrites at some distance from the data-entry field. In this case the guide application can determine an orientation for the handwriting guide based on the writing instead of the data-entry field. This can be especially useful in cases where the handwriting guide is opaque because it permits a user to determine what part of a screen is obscured by where the user begins his or her handwriting.

In another embodiment, the guide application receives information indicating a data-entry field for entry of handwriting. Here the guide application can orient the handwriting guide based on the location of the data-entry field, whether or not handwriting has begun. The orientation for the handwriting guide can be geographically associated with the data-entry field, such as by being in physical proximity to, connected to, or superimposed over the data-entry field, for instance.

At block 506, the guide application presents a handwriting guide. The handwriting guide is a user interface indicating an area over which handwriting can be made and received. This user interface can guide a user's handwriting, such as by directing his or her size and angle of handwriting. In one embodiment the handwriting guide is presented as a solid, opaque window superimposed on the screen.

In another embodiment, the handwriting guide is presented having a lined border (e.g., a dashed-line box) that is otherwise substantially translucent. This translucence permits the user to view information previously viewable on the screen prior to the handwriting guide being presented. Thus, it does not substantially obscure context for the data-entry field or other features and information on the screen that is "under" the guide.

In still another embodiment, the handwriting guide is presented as a partially translucent area superimposed on the screen that shades the area occupied by the handwriting guide but permits the user to view substantially all features viewable on the screen prior to the handwriting guide being presented. By so doing, the handwriting guide leaves features and information on the screen substantially unobscured.

Figure 6:
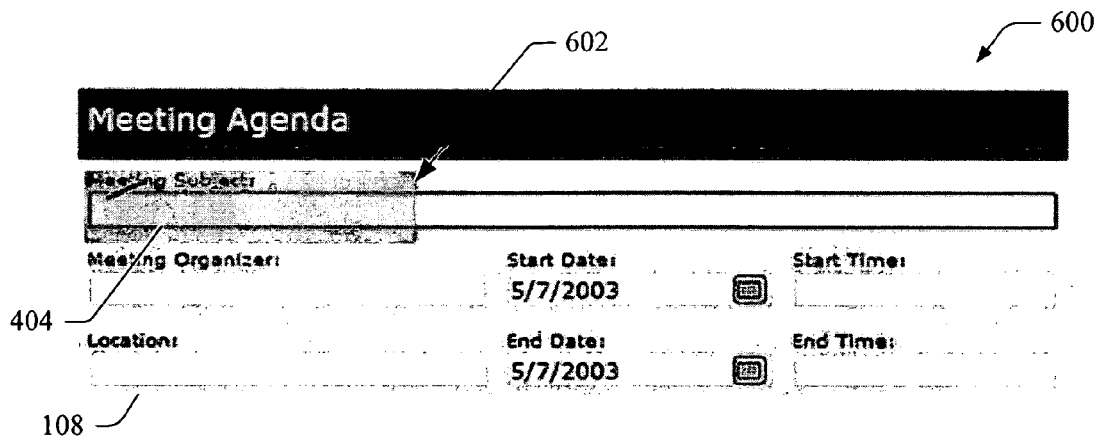
FIG. 6 illustrates an exemplary screen shot showing an exemplary handwriting guide.

As an example, consider FIG. 6. There, the architecture presents a screen shot 600 of data-entry form 108 with an exemplary handwriting guide 602. In this ongoing, illustrated example, the guide application has received location information indicating that meeting subject field 404 (shown also in FIG. 4) is the field into which the handwriting should be entered. Responsive to this information, the guide application associates the handwriting guide to and orients it over the meeting subject field. This handwriting guide provides guidance to a user as to acceptable character size and angle at which to write, while also permitting the user to view context for the data-entry field by permitting substantially all of the information on the screen to be viewed (in this example the text "Meeting Subject:").

Returning to FIG. 5, at block 508, the guide application receives handwriting indicia. This handwriting indicia can be in addition to the indicia already received and used as a basis for the orientation of the handwriting guide or can be indicia for the first handwriting received. The guide application can forward this handwriting indicia to ink recognition application 110, after which it can be converted to text and entered into an appropriate data-entry field. The guide application can forward this handwriting indicia after receiving an indication that a user is finished, such as with a command, or after a certain amount of time has passed. In addition, the guide application can alter the handwriting guide based on handwriting indicia received.

Figure 7:
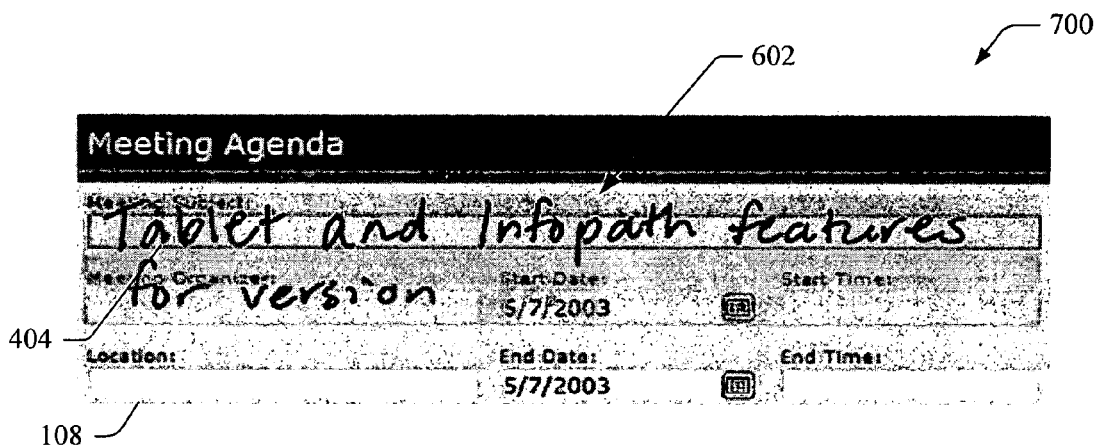
FIG. 7 illustrates an exemplary screen shot showing the exemplary handwriting guide of FIG. 6 having an altered size and additional handwriting.

Continuing the ongoing illustrated example, FIG. 7 shows a screen shot 700 which is presented to the user. The screen shot shows the handwriting guide having an altered size from that shown in FIG. 6. In this example, the guide application receives additional handwriting indicia from a user indicating that the user is or may run out of room in the handwriting guide. Based on this information, the guide application expands the handwriting guide. Thus, when the user begins to write the word "and", the guide application lengthens the handwriting guide. Likewise, when the user continues and writes the word "features", the guide application adds a second line or increase the geometric footprint of the handwriting guide. Note that the handwriting guide does not substantially obscure the features of the screen, such as three data-entry fields and the following information: "Meeting Subject:"; "Meeting Organizer:"; "Start Date:"; "Start Time:"; and "5/7/2003".

Figure 8:
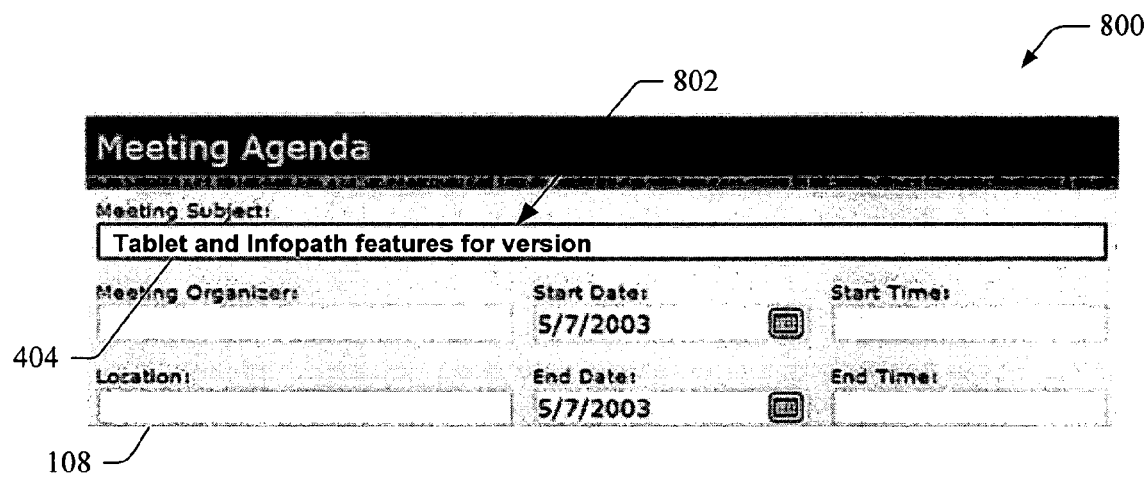
FIG. 8 illustrates an exemplary screen shot showing text converted from handwriting and entered into a data-entry field.

Returning to FIG. 5, at block 510, the architecture converts handwriting received in the writing guide into text and enters that text into the data-entry field. As an example, consider FIG. 8. There, the architecture presents a screen shot 800 showing text 802 in meeting subject field 404 that is a conversion of the handwriting written into the guide application and received as handwriting indicia at block 508. In this illustrated example, the handwriting enabled and received by the architecture and the guide application, "Tablet and Infopath features for version" is entered as text into the meeting subject field.

CONCLUSION

The above-described tools enable a user to write text into a data-entry field on a computing device's screen without independently selecting that data-entry field. These tools can also provide a handwriting guide capable of guiding a user's handwriting that is geographically associated with a data-entry field into which the user is intending to write and that permits substantially all features of a computing device's screen to be viewed. Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method comprising:
   receiving handwriting made to a screen showing two or more data-entry fields, wherein at least a portion of the handwriting overlaps two or more data-entry fields; and
   entering text converted from the received handwriting into one of the data-entry fields without independently receiving a non-writing-based selection of that data-entry field.

2. The method of claim 1, wherein the act of receiving comprises receiving handwriting made over the screen with a stylus.

3. The method of claim 1, further comprising determining the data-entry field into which to enter the converted text using a bounding-type algorithm.

4. The method of claim 3, wherein the act of determining comprises determining a geographic relation between a first stroke or character of the received handwriting and the data-entry field.

5. The method of claim 1, further comprising presenting a handwriting guide in geographical association with the received handwriting.

6. The method of claim 5, wherein the handwriting guide both guides a user's handwriting and permits features that lie underneath the guide to be viewed by the user.

7. The method of claim 5, wherein the handwriting guide is capable of receiving additional handwriting made to the screen and guiding an angle and size of the additional handwriting while leaving features of the screen generally unobscured, and wherein the act of entering text comprises entering text converted from the additional handwriting into the data-entry field.

8. A computing device having a screen computer-readable media, and a processor capable of executing computer code stored on the computer-readable media, comprising of:
   Presenting one or more data-entry fields on the screen;
   Receiving handwriting made to the screen, wherein at least a portion of the handwriting overlaps two or more data-entry fields;
   Entering text converted from the handwriting into one of the data-entry fields without interaction independent of the handwriting received.

9. The device of claim 8 embodied as a hand-held computer.

10. The device of claim 8, wherein the screen comprises a tablet screen capable of receiving handwriting made over the tablet screen.

11. The device of claim 8, further capable of presenting a handwriting guide on the screen in geographical association with the selected data-entry field.

12. The device of claim 11, wherein the handwriting guide is capable of receiving additional handwriting made to the screen and guiding a size and angle of the additional handwriting while leaving features of the screen substantially unobscured.

13. The device of claim 8, further capable of selecting a data-entry field based on the location on the screen of the handwriting received and the data-entry field.

14. One or more computer-readable storage media having computer-executable instructions that, when executed, implement a method comprising:
   receiving handwriting made to a screen showing two or more data-entry fields, wherein at least a portion of the handwriting overlaps the two or more data-entry fields; and
   entering text converted from the received handwriting into one of the data-entry fields without independently receiving a non-writing-based selection of that data-entry field.

15. The one or more computer-readable storage media of claim 14, further comprising displaying a handwriting guide in geographical association with the received handwriting, wherein the handwriting guide is capable of permitting content of the data-entry fields and other features that lie 5 underneath the handwriting guide to be viewed.

16. The one or more computer-readable storage media of claim 15, wherein the handwriting guide is capable of guiding an angle and size of the user's handwriting.

17. The one or more computer-readable storage media of claim 15, wherein the handwriting guide is capable of receiving additional handwriting made to the screen and guiding an angle and size of the additional handwriting while leaving features of the screen generally unobscured.

18. The one or more computer-readable storage media of claim 14, wherein the screen comprises a tablet screen and the act of receiving comprises receiving handwriting made over the tablet screen.

19. The one or more computer-readable storage media of claim 14, further comprising selecting, responsive to the handwriting received, a data-entry field that is viewable on the screen.

* * * * *

UNITED STATES PATENT AND TRADEMARK OFFICE
CERTIFICATE OF CORRECTION

Page 1 of 1

| | |
|---|---|
| PATENT NO. | : 7,692,636 B2 |
| APPLICATION NO. | : 10/955665 |
| DATED | : April 6, 2010 |
| INVENTOR(S) | : Jane T. Kim et al. |

It is certified that error appears in the above-identified patent and that said Letters Patent is hereby corrected as shown below:

In column 7, line 41, in Claim 8, delete "screen" and insert -- screen, --, therefor.

In column 7, line 44, in Claim 8, delete "Presenting" and insert -- presenting --, therefor.

In column 7, line 45, in Claim 8, delete "Receiving" and insert -- receiving --, therefor.

In column 7, line 47, in Claim 8, after "fields;" insert -- and --.

In column 7, line 48, in Claim 8, delete "Entering" and insert -- entering --, therefor.

In column 7, line 49, in Claim 8, after "without" insert -- user --.

In column 8, line 32, in Claim 15, after "lie" delete "5".

Signed and Sealed this
Fifteenth Day of February, 2011

David J. Kappos
*Director of the United States Patent and Trademark Office*